(12) United States Patent
Hayashi

(10) Patent No.: US 6,847,599 B2
(45) Date of Patent: Jan. 25, 2005

(54) DISC DRIVE APPARATUS

(75) Inventor: Tsuneo Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 698 days.

(21) Appl. No.: 09/948,400

(22) Filed: Sep. 7, 2001

(65) Prior Publication Data

US 2002/0031070 A1 Mar. 14, 2002

(30) Foreign Application Priority Data

Sep. 11, 2000 (JP) ..................................... P2000-280144

(51) Int. Cl.[7] ............................................. G11B 20/00
(52) U.S. Cl. ................. 369/53.22; 369/53.15; 369/53.23; 369/44.26; 369/44.13; 369/124.05
(58) Field of Search ........................... 369/44.26, 47.19, 369/44.13, 53.23, 53.15, 53.22, 53.31, 53.37, 124.05

(56) References Cited

U.S. PATENT DOCUMENTS 4,833,662 A * 5/1989 Yoda ....................... 369/53.31
5,689,487 A * 11/1997 Iwanaga ................... 369/53.15

* cited by examiner

Primary Examiner—William Korzuch
Assistant Examiner—Kim-Kwok Chu
(74) Attorney, Agent, or Firm—Frommer Lawrence & Haug LLP; William S. Frommer

(57) ABSTRACT

A disc drive apparatus for recording or playing back data onto and from an optical-disc recording medium having a plurality of signal surface areas outputting detected information as reflected detection signals with different amplitudes, the disc drive apparatus including: reflected-light quantity detection means for detecting a total quantity of a light reflected by a signal surface of the optical-disc recording medium and outputting a reflected-light quantity detection signal representing the total quantity; integration means for integrating the reflected-light quantity detection signal and providing an integration output representing a result of integration of the reflected-light quantity detection signal; and identification-signal generation means for comparing the level of the reflected-light quantity detection signal with the level of the integration output used as a threshold value and for outputting an identification signal identifying a specific signal surface area among the signal surface areas as a result of comparison.

6 Claims, 16 Drawing Sheets

FIRST IMPLEMENTATION

FIRST IMPLEMENTATION

SECOND IMPLEMENTATION

FIG. 9A
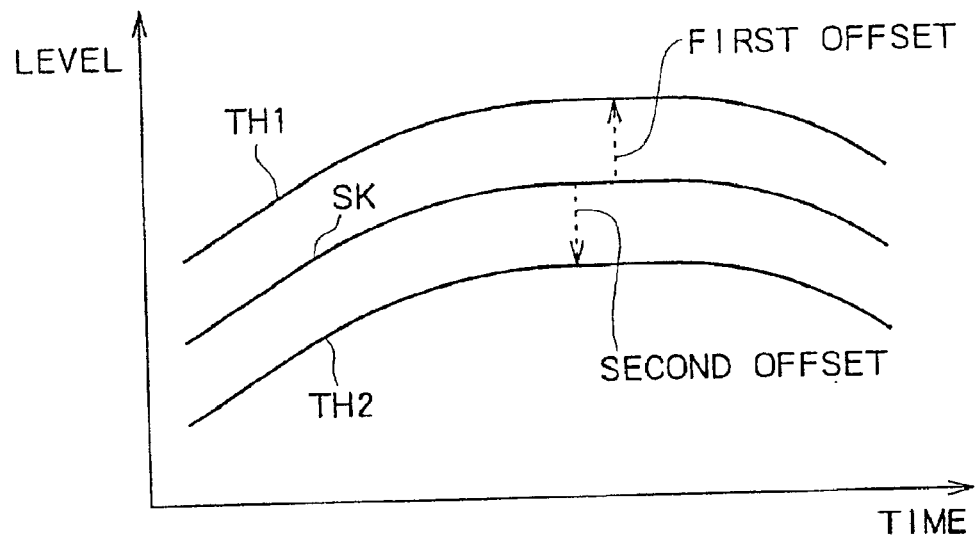
FIG. 9B
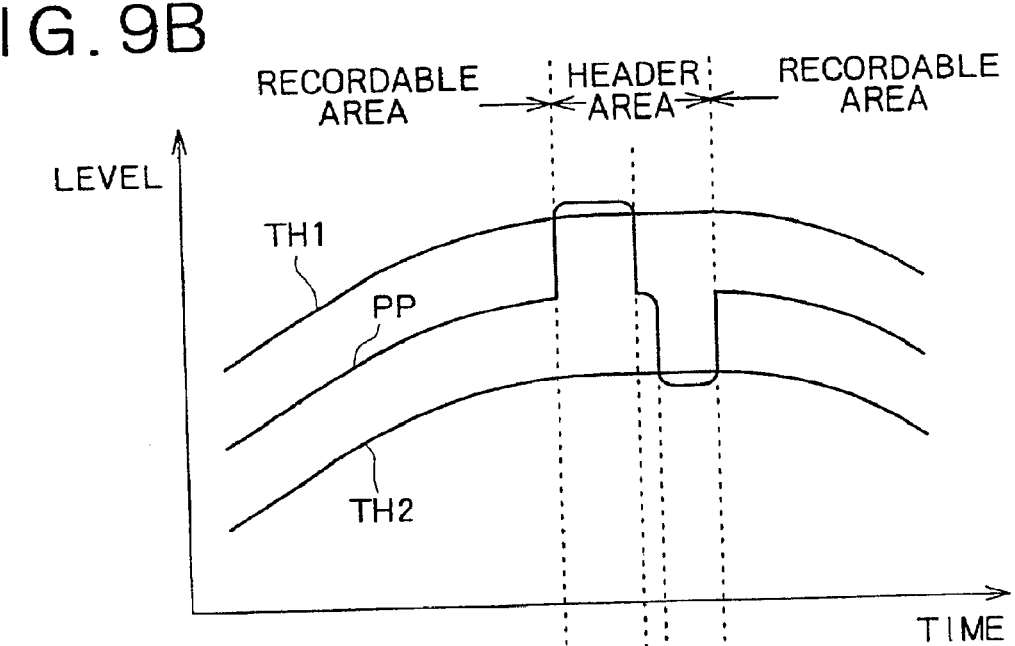
FIG. 9C
DT·H-1
FIG. 9D
DT·H-2

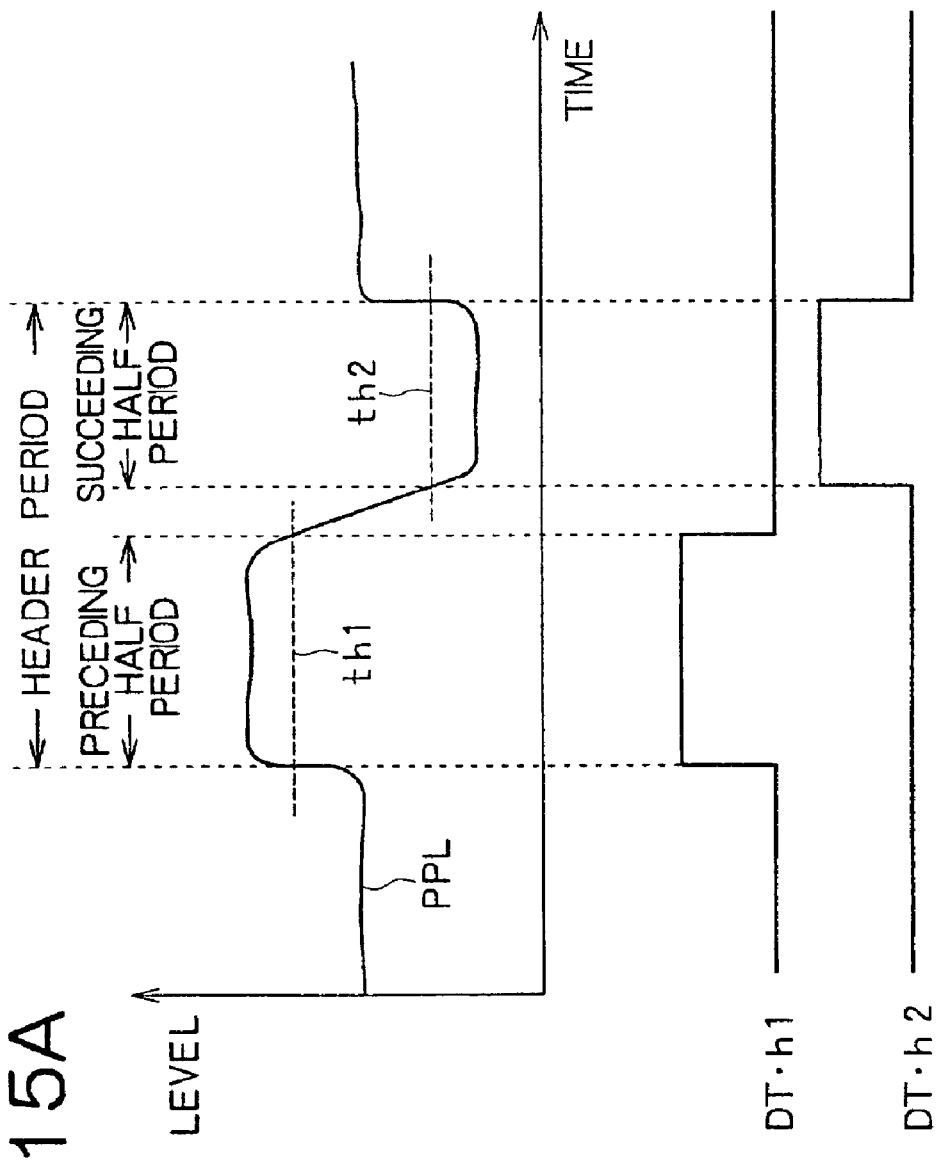

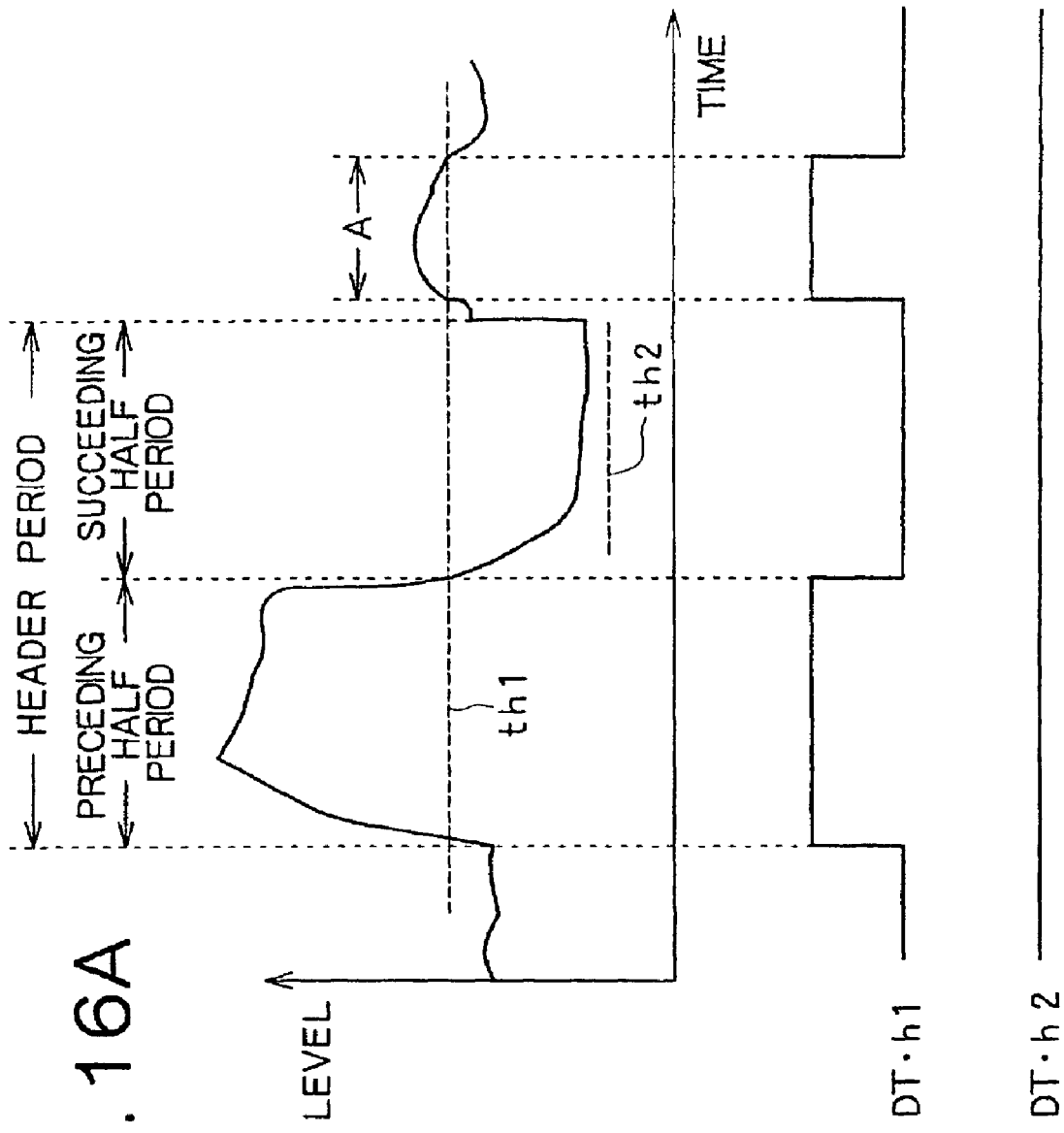

DISC DRIVE APPARATUS

BACKGROUND OF THE INVENTION

The present invention relates to a disc drive apparatus capable of recording or playing back data onto and from an optical-disc recording medium. More particularly, the present invention relates to a disc drive apparatus for recording or playing back data onto and from an optical-disc recording medium having a plurality of signal surface areas outputting detected information as reflected detection signals with different amplitudes.

A DVD (Digital Versatile Disc or Digital Video Disc) is known as disc media. A DVD has been developed as the so-called DVD-ROM and the so-called DVD-RAM, which have been becoming popular. A DVD-ROM is a playback-only DVD onto which data cannot be recorded. On the other hand, a DVD-RAM is a DVD that allows data stored thereon to be rewritten. Data is recorded onto a DVD-RAM by creation of recording pits by adopting the so-called phase-change technique.

In accordance with a track format of a DVD-RAM, a recording track which data is recorded onto and played back from is divided into units each called a sector in the circumferential direction. Each sector is a recordable area with the beginning thereof serving as a header area.

A header area is area in which data is recorded as a pit array. On the other hand, the remaining recordable area is an area used for recording data that can be rewritten by adoption of the phase-change technique. That is to say, the header area adopts a recording technique different from that adopted for the recordable area. Thus, the optical quantity of a laser beam radiated to the header area and then reflected thereby is also different from the optical quantity of a laser beam radiated to the recordable area and then reflected thereby.

Roughly speaking, the header area includes 4 recorded addresses, namely, PID1, PID2, PID3 and PID4 which are each a physical address. Pit arrays of PID1 and PID2 are placed at locations shifted from the center line of a groove track by ½ track pitches in the direction toward a circumference on the outer side. On the other hand, pit arrays of PID3 and PID4 are placed at locations shifted from the center line of the groove track by ½ track pitches in the direction toward a circumference on the inner side. That is to say, 2 track positions in the header area are separated from a track position in the recordable area by ½ track pitches in the radial direction of the disc toward circumferences on the outer and inner sides respectively. It should be noted that data is recorded onto a DVD-RAM by adoption of the so-called land-groove recording technique whereby data is recorded onto both a land and a groove.

For the reason described above, in a disc drive apparatus for a DVD, during an operation to play back data from the DVD, for example, it is necessary to hold a tracking servo control while a laser beam tracing a track is passing through a header area. That is to say, if the tracking servo control is held while the laser beam tracing a track is passing through a header area, there is generated no shift from the track of the recordable area in the trace position of the laser beam in the tracking direction.

In addition, since a header area adopts a recording technique different from that adopted by a recordable area as described above, it is necessary to modify a variety of parameters or the like of a playback-signal-processing circuit.

In order to hold the tracking servo control and to modify a variety of parameters or the like of the playback-signal-processing circuit with a proper timing, that is, while the laser beam tracing a track is passing through a header area, as described above, it is also necessary to detect the proper timing with which the laser beam tracing a track is passing through the header area.

It should be noted that, in the following description, the detection of the proper timing with which the laser beam tracing a track is passing through a header area is also referred to simply as header detection.

The conventional header detection is explained by referring to FIG. 14 and FIGS. 15A to 15C as follows.

FIG. 14 is a diagram showing a typical configuration of a header detection circuit. An optical pickup 101 radiates a laser beam for playing back data to a disc 1 serving as a DVD. The radiated laser beam is reflected, and the reflected laser beam is received as an optical-reception signal by a photo detector not shown in the figure in a detection process. The optical-reception signal is then supplied to a push-pull signal generation circuit 102. The push-pull signal generation circuit 102 uses the optical-reception signal supplied thereto to generate a push-pull signal PP. Roughly speaking, the push-pull signal PP is generated as a differential signal between 2 detection signals detected by 2 optical-reception areas which are obtained as a result of dividing the photo detector by a dividing line oriented in the track direction.

The push-pull signal PP output by the push-pull signal generation circuit 102 is supplied to a low-pass filter 103 for eliminating harmonic components from the push-pull signal PP so as to produce a smooth envelop waveform. A push-pull signal PPL passing through the low-pass filter 103 is split, being supplied to comparators 104 and 105.

In a process to correctly detect a header, for example, the push-pull signal PPL has a waveform shown in FIG. 15A. As shown in the figure, in a header period corresponding to a laser beam's passing through a header area, the waveform is divided into a preceding half period and a succeeding half period, which correspond to detection of pit arrays of PID1 and PID2 and detection of pit arrays of PID3 and PID4 respectively. As is obvious from an earlier description, the pit arrays of PID1 and PID2 are separated from the pit arrays of PID3 and PID4 by 1 track pitch. As shown in the figure, the waveform of the preceding half period is an inverted one of the waveform of the succeeding half period. To be more specific, in the case shown in the figure, the waveform of the preceding half period has a positive polarity while the waveform of the succeeding half period has a negative polarity. It should be noted, however, that the waveform of the preceding half period can also have a negative polarity while the waveform of the succeeding half period has a positive polarity. The polarities of the waveform of the preceding half period and the waveform of the succeeding half period are determined by whether the recording track of the recordable area following the head area is a land or a track.

In the header detection circuit shown in FIG. 14, the push-pull signal PPL passing through the low-pass filter 103 is split, being supplied to the comparators 104 and 105 as described above each to be compared with a reference value. The reference value used for comparison in the comparator 104 is a predetermined threshold value th1 set for the detection waveform in the positive-polarity direction. On the other hand, the reference value used for comparison in the comparator 105 is a predetermined threshold value th2 set for the detection waveform in the negative-polarity direction. The threshold values th1 and th2 are each a constant determined in advance. In FIG. 15A, the levels of the threshold values th1 and th2 are each indicated by a dashed line.

The comparator 104 compares the push-pull signal PPL with the threshold value th1. If the absolute value of the level of the push-pull signal PPL exceeds the absolute value of the threshold value th1, a detection signal DT·h1 set at an H level is output as shown in FIG. 15B.

By the same token, the comparator 105 compares the push-pull signal PPL with the threshold value th2. If the absolute value of the level of the push-pull signal PPL exceeds the absolute value of the threshold value th2, a detection signal DT·h2 set at an H level is output as shown in FIG. 15C.

As described above, the detection signals DT·h1 and DT·h2 are set at a high level to indicate the preceding half period and the succeeding half period of the header period respectively. In this way, the preceding half period and the succeeding half period of the header period are detected in processing called the header detection cited above.

As described above, however, the header detection is carried out by comparing a push-pull signal PPL with a fixed threshold value. It is thus quite within the bounds of possibility that the header detection is carried out incorrectly due to the fact that the threshold value is fixed. This problem is described by referring to FIGS. 16A to 16C.

In the case of an abnormality such as a detrack caused by disc eccentricity, vibration of the position of a laser-beam spot or a defect caused by dirt or dust stuck on the surface of the disc, for example, an unnecessary offset may unavoidably be added to the push-pull signal PPL itself as shown in FIG. 16A as an effect of the abnormality. As shown in the figure, the offset is inadvertently added to the push-pull signal PPL so that the level of the push-pull signal PPL is raised.

When the push-pull signal PPL with such an offset added thereto is compared with the threshold value th1 and the threshold value th2 by the comparator 104 and the comparator 105 respectively, to put it concretely, the absolute value of the push-pull signal PPL shown in FIG. 16A does not exceed the absolute value of the threshold value th2 during the header period's succeeding half period in which the absolute value of a normal push-pull signal PPL would naturally exceed the absolute value of the threshold value th2. Thus, there is resulted in a state in which the signal DT·h2 cannot be output at the H level as shown in FIG. 16C.

Since an offset is inadvertently added to the push-pull signal PPL to raise the level in the positive direction as shown in FIG. 16A, on the contrary, the signal DT·h1 exceeds the level of the threshold value th1 not only during the header period's preceding half period in which a normal push-pull signal PPL can exceed the threshold value th1, but also, for example, a period A outside the header period. Thus, the signal DT·h1 is set at the H level also during the period A outside the header period as shown in FIG. 16B, causing incorrect header detection.

SUMMARY OF THE INVENTION

Since it is necessary to hold the tracking servo control and to modify a variety of parameters or the like of a playback-signal-processing circuit with a proper timing, that is, while the laser beam tracing a track is passing through a header area, as described above, the header detection for determining the timing must be carried out correctly. Thus, the more frequently the incorrect head detection is carried out, the more the reliability of the playback performance deteriorates.

It is thus an object of the present invention to provide a disc drive apparatus capable of detecting a specific area on a disc such as the header area as well as possible.

Addressing the problems described above, in accordance with an aspect of the present invention, there is provided a disc drive apparatus for recording or playing back data onto and from an optical-disc recording medium having a plurality of signal surface areas outputting detected information as reflected detection signals with different amplitudes. The disc drive apparatus has a configuration including reflected-light quantity detection means for detecting a total quantity of a light reflected by a signal surface of the optical-disc recording medium and outputting a reflected-light quantity detection signal representing the total quantity; and integration means for integrating the reflected-light quantity detection signal and providing an integration output representing a result of integration of the reflected-light quantity detection signal.

The disc drive apparatus further has identification-signal generation means for comparing the level of the reflected-light quantity detection signal with the level of the integration output used as a threshold value and for outputting an identification signal identifying a specific signal surface area among the signal surface areas as a result of comparison.

In the configuration described above, a reflected-light quantity detection signal representing a total quantity of a light reflected by a specific signal surface area of the optical-disc recording medium is used as a signal for detecting the specific signal surface area. Then, the level of the reflected-light quantity detection signal is compared with the level of a threshold value to identify the specific signal surface area. Since the threshold value is a result of integration of the reflected-light quantity detection signal, the threshold value is not fixed. If an offset is inadvertently added to the reflected-light quantity detection signal to raise its level for a variety of reasons, for example, the threshold value also increases as well, following the raise in level.

In addition, in accordance with another aspect of the present invention, there is provided a disc drive apparatus for recording or playing back data onto and from an optical-disc recording medium having a plurality of signal surface areas outputting detected information as reflected detection signals with different amplitudes. The disc drive apparatus has a configuration including: reflected-light quantity detection means for detecting a total quantity of a light reflected by a signal surface of the optical-disc recording medium and outputting a reflected-light quantity detection signal representing the total quantity; differentiation means for differentiating the reflected-light quantity detection signal and providing a differentiation output representing a result of differentiation of the reflected-light quantity detection signal; and first integration means for integrating the differentiation output at a predetermined time constant and providing a first integration output representing a result of integration of the differentiation output.

The disc drive apparatus further has identification-signal generation means for comparing the level of the differentiation output with the level of the first integration output used as a threshold value and for outputting an identification signal identifying a specific signal surface area among the signal surface areas as a result of comparison.

In the configuration described above, a reflected-light quantity detection signal representing a total quantity of a light reflected by a specific signal surface area of the optical-disc recording medium is used as a signal serving as a basis for detecting the specific signal surface area. First of all, the reflected-light quantity detection signal is differentiated to produce a differentiation output. Then, the level of a signal based on the differential output is compared with the level of a threshold value, which is obtained as a result of integration of the differentiation output, to identify the specific signal surface area.

Also in the configuration described above, since the threshold value is a result of integration of a signal originated from the reflected-light quantity detection signal, the threshold value is not fixed. If an offset is inadvertently added to the reflected-light quantity detection signal to raise its level for a variety of reasons, for example, the threshold value also increases as well, following the raise in level.

In addition, in this case, the level of the differentiation output obtained as a result of differentiation of the reflected-light quantity detection signal is compared with the level of a threshold value where the threshold value is an integration output obtained as a result of integration of the differentiation output. In this way, the differentiation output is used as an input to be compared with the threshold value. That is to say, a signal emphasizing a waveform change of the reflected-light quantity detection signal is used in detection of the specific signal surface area generating the reflected-light quantity detection signal. As a result, the specific signal surface area can be detected with a high degree of precision.

Furthermore, in accordance with a further aspect of the present invention, there is provided a disc drive apparatus for recording or playing back data onto and from an optical-disc recording medium having a plurality of signal surface areas outputting detected information as reflected detection signals with different amplitudes. The disc drive apparatus has a configuration including: signal generation means for generating a reflected-light detection signal by carrying out predetermined processing based on detection signals obtained by split optical reception of a light reflected by a signal surface of the optical-disc recording medium; integration means for integrating the reflected-light detection signal and providing an integration output representing a result of integration of the reflected-light detection signal; and offset means for providing an offset having a predetermined magnitude to the level of the integration output.

The disc drive apparatus further has identification-signal generation means for comparing the level of the reflected-light detection signal with a threshold value obtained as a sum of the level of the integration output and the offset provided by the offset means, and for outputting an identification signal identifying a specific signal surface area among the signal surface areas as a result of comparison.

In the configuration described above, a reflected-light detection signal obtained as a result of the predetermined processing based on a detection signal obtained by split optical reception of a light reflected by a signal surface of the optical-disc recording medium is used for detection of a specific signal surface area.

Then, an offset is added to an integration output obtained as a result of integration of the reflected-light detection signal to give a signal used as a threshold value. Finally, an identification signal is generated as a result of comparison of the threshold value with the level of the reflected-light detection signal.

The reflected-light detection signal itself may have an offset vibrating due to a cause such as a detrack. In the configuration described above, however, the reflected-light detection signal is used in generation of the threshold value so that the threshold value includes a variable component of the offset. In other words, in comparison of the signal levels, offset variations of the reflected-light detection signal are canceled. It is thus possible to detect a waveform change of the reflected-light detection signal with a high degree of accuracy in detection of a specific signal surface area without being affected by the offset variations of the reflected-light detection signal.

BRIEF DESCRIPTION OF THE DRAWINGS

FIGS. 9A to 9D are timing charts of the operation of the header detection unit implemented by the third implementation;

FIGS. 15A to 15C are explanatory diagrams showing header-detection operations carried out by a circuit having the configuration shown in FIG. 14; and FIGS. 16A to 16C are explanatory diagrams showing a case in which a header is detected incorrectly in the header-detection operations carried out by the circuit having the configuration shown in FIG. 14.

PREFERRED EMBODIMENTS OF THE INVENTION

Some preferred embodiments of the present invention are explained below. Disc drive apparatuses implemented by the embodiments of the present invention each have a configuration capable of playing back data from a DVD-RAM. In actuality, they are each also capable of playing back data from a DVD-ROM and a disc with a CD format such as a CD-DA (Digital Audio) and a CD-ROM.

The embodiments are described in the following order:
1: Track Format of the DVD-RAM
2: Configuration of the Disc Drive Apparatus
3: Configuration of the Header Detection Unit
   3-1: First Implementation
   3-2: Second Implementation
   3-1: Third Implementation
1: Track Format of the DVD-RAM The description begins with a simple and plain explanation of a track format of a DVD-RAM, from which data can be played back by a disc drive apparatus implemented by any of the embodiments of the present invention, with reference to FIGS. 10 to 12.

A DVD-RAM is disc media allowing rewrite operations to be carried out adopting the so-called phase-change technique. The recording capacity of the DVD-RAM is 4.7 GB per side in an unformatted state.

Figure 10:
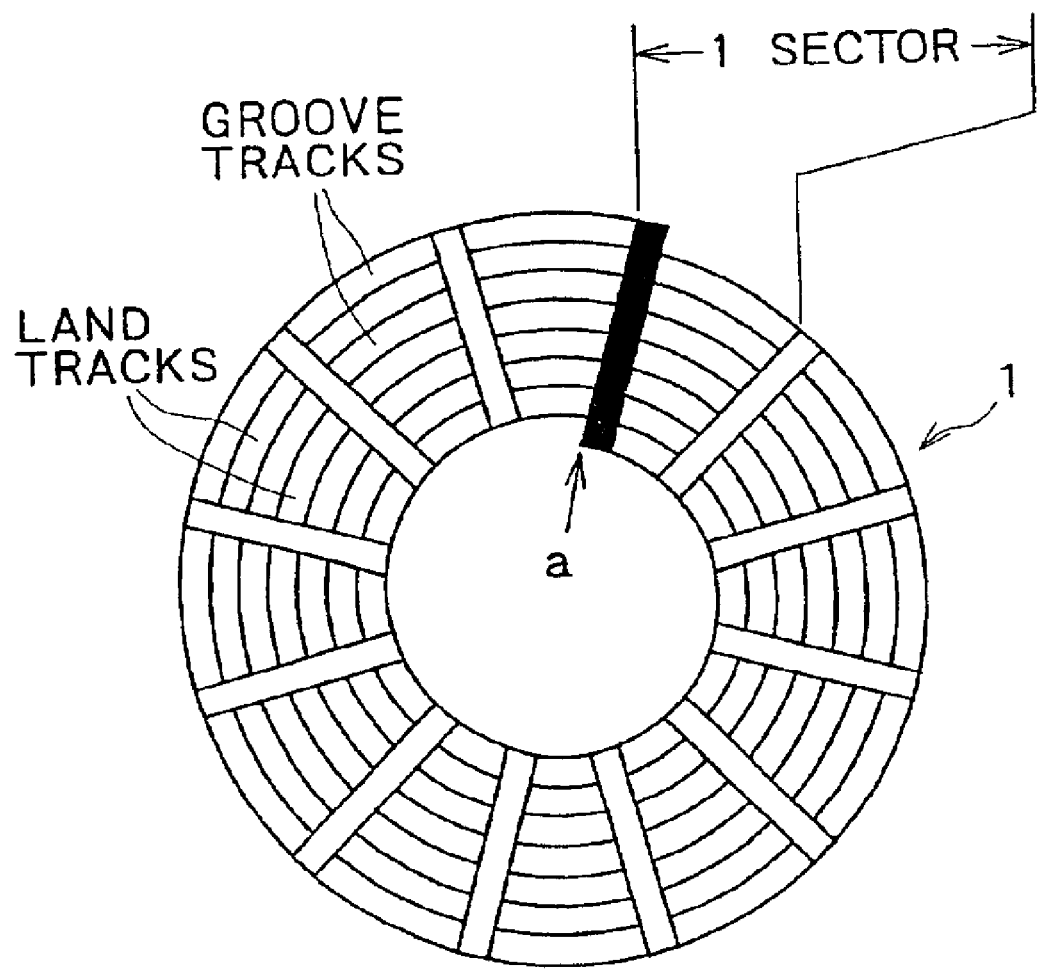
FIG. 10 is an explanatory diagram showing a track format of an entire disc-shaped DVD-RAM.

FIG. 10 is a diagram conceptually showing the structure of the whole disc 1 in the DVD-RAM track format.

The optical disc 1 shown in the figure is a DVD-RAM. A recording track on this DVD-RAM is the so-called single spiral comprising grooves (dented portions) and a protruding land between any 2 adjacent grooves. The DVD-RAM adopts the so-called land & groove recording technique whereby both the grooves and the lands are used as recording tracks for recording data. The adoption of this recording technique contributes to the enhancement of the recording density.

The land tracks and the groove tracks cross a straight line drawn in the disc radial direction indicated by an arrow a at points laid out alternately along the straight line, forming a single track extended with a spiral shape from an inner side of the optical disc 1 to an outer side thereof.

In addition, as shown in FIG. 10, the recording track comprising land and groove tracks is divided into a plurality of sectors in the circumferential direction. The structure of each sector is shown in FIGS. 11 and 12.

Figure 11:
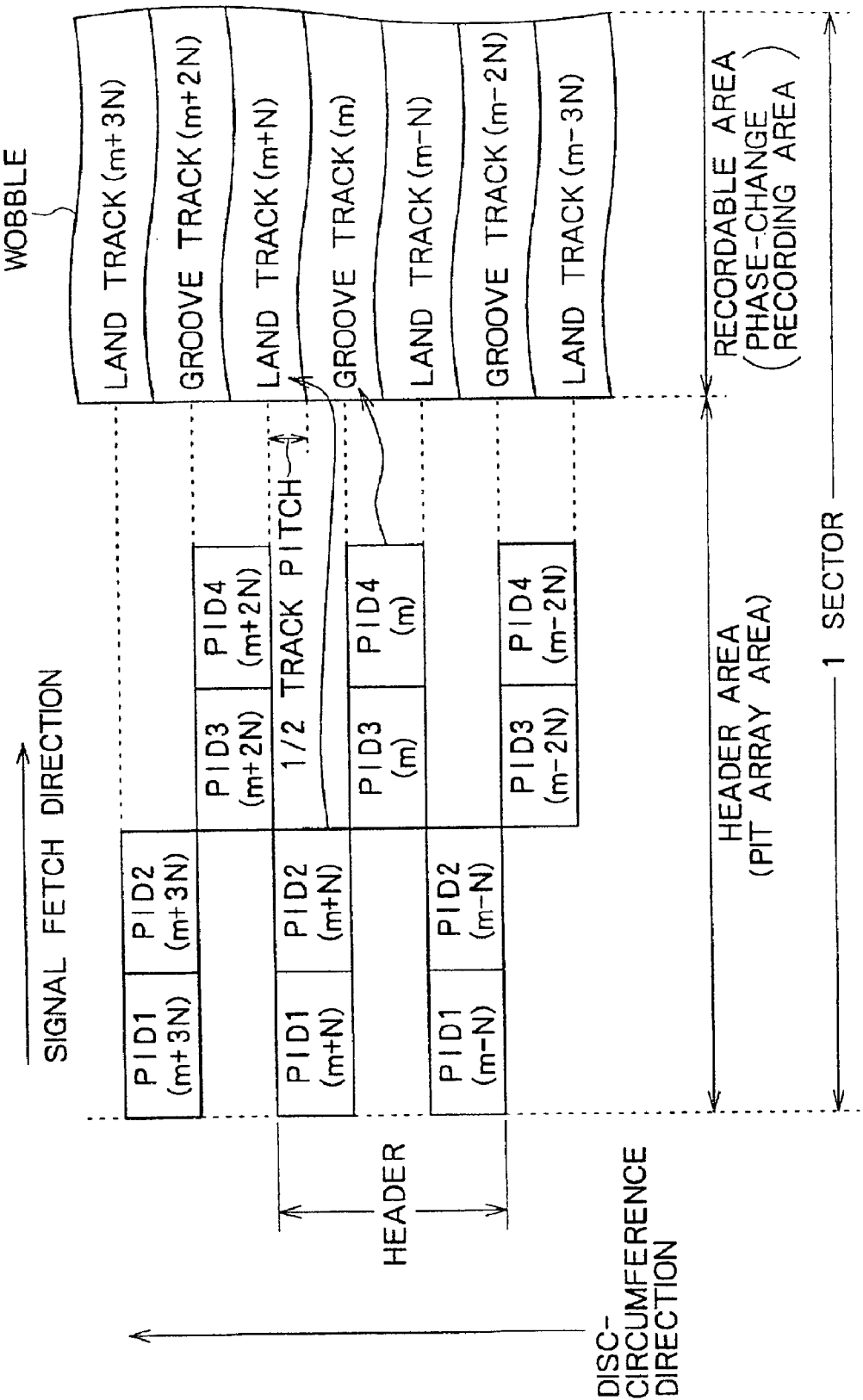
FIG. 11 is an explanatory diagram conceptually showing the layout of tracks in a sector according to the track format of the DVD-RAM.
Figure 12:
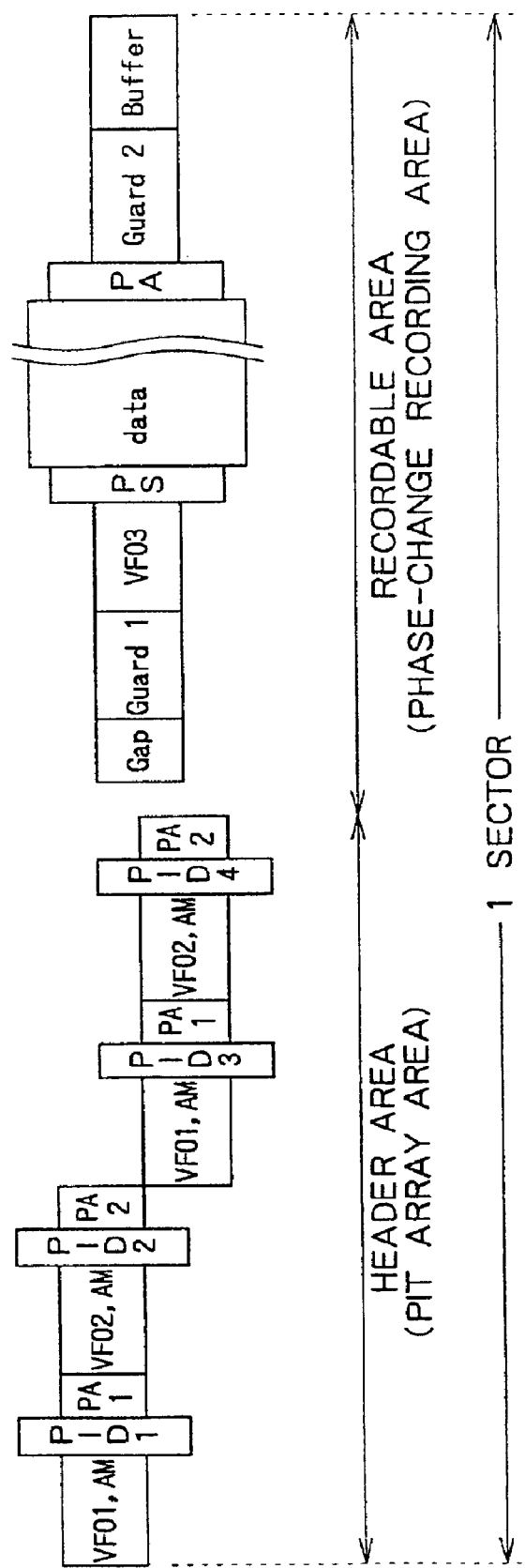
FIG. 12 is an explanatory diagram conceptually showing the structure of data recorded in a sector in accordance with the track format of the DVD-RAM.

As shown in FIG. 11, 1 sector starts with a header area followed by a recordable area. In the header area, PIDs each representing a physical address on the optical disc 1 are recorded as a pit array as shown in the figure. The recordable area is an area for allowing data recorded therein to be rewritten by adoption of the phase-change technique. The recordable area is laid on a land track or a groove track. As shown in the figure, the land tracks and the groove tracks are laid alternately in the radial direction of the disc. A land track or a groove track in a sector has the so-called wobbled shape with 232 cycles. In the DVD-RAM, a clock signal is recorded as this wobbled shape.

The PIDs recorded in a header area are PID1, PID2, PID3 and PID4 which together form a set called a header. Data of PID1 is identical with that of PID2. By the same token, data of PID3 is identical with that of PID4. Pit arrays of PID1 and PID2 are placed at locations shifted from the center line of the groove track by ½ track pitches in the direction toward a circumference on the outer side. On the other hand, pit arrays of PID3 and PID4 are placed at locations shifted from the center line of the groove track by ½ track pitches in the direction toward a circumference on the inner side.

Such a layout of PIDs each representing an address is called a CAPA (Complimentary Allocated Pit Address) layout. A groove track and typically a land track adjacent to the groove track in the outer-circumference direction share a common header. That is to say, when the groove track is traced, the address of a sector in the groove track is indicated by PID3 and PID4 recorded in the common header. By the same token, when the land track is traced, the address of a sector in the groove track is indicated by PID1 and PID2 also recorded in the common header.

Such an address layout eliminates for example cross-talk between adjacent pit arrays. In addition, by allowing a groove track and typically a land track adjacent to the groove track in the outer-circumference direction to share a common header, the number of headers is cut by 50% in comparison with a layout in which a header is allocated to each of the land and groove tracks. That is to say, the size of the redundant area can be reduced to increase the recording capacity of the optical disc 1 accordingly.

As an example, consider a header comprising a set of PID1 (m+N), PID2 (m+N), PID3 (m) and PID4 (m) as shown in FIG. 11. As described above, PID1 (m+N) and PID2 (m+N) are placed at a location shifted from the center line of a groove track (m) by ½ track pitches in the outer-circumference direction. On the other hand, PID3 (m) and PID4 (m) are placed at a location shifted from the center line of the groove track (m) by ½ track pitches in the inner-circumference direction.

PID1 (m+N) and PID2 (m+N) serve as the address of a sector that includes the header when the land track (m+N) adjacent to the groove track (m) in the outer-circumference direction is traced. On the other hand, PID3 (m) and PID4 (m) serve as the address of the sector when the groove track (m) is traced.

FIG. 12 is a diagram showing the structure of a data array recorded in 1 sector.

The data array begins with 4 PIDs, namely PID1, PID2, PID3 and PID4, which are recorded in the header area. VFO (Variable Frequency Oscillator) 1 and an address mark AM precede PID1 while a post amble PA1 succeeds PID1. By the same token, VFO 1 and an address mark AM precede PID3 while a post amble PA1 succeeds PID3.

On the other hand, VFO 2 and an address mark AM precede PID2 while a post amble PA2 succeeds PID2. By the same token, VFO 2 and an address mark AM precede PID4 while a post amble PA2 succeeds PID4.

VFO1 and VFO2 are each a code for synchronizing a VFO (Variable Frequency Oscillator) of a PLL circuit employed in the disc drive apparatus. The VFO and the PLL circuit will be described later. That is to say, VFO1 and VFO2 are used for playing back a clock signal.

The address mark AM is used for providing the disc drive apparatus with byte synchronization of a PID following the address mark AM. The address mark AM has a predetermined pattern. The post ambles PA1 and PA2 each serve as a boundary area.

The recordable area begins with a gap followed sequentially by a guard 1 and VFO3. The area of the gap and the guard 1 is provided for physically protecting a data area described below. Much like VFO1 and VFO2, which are described above, VFO3 is used for playing back a clock signal.

VFO3 is followed by an amble PS which is succeeded by the data area used for recording user data. The data area is followed by a post amble PA3.

The post amble PA3 is followed sequentially by a guard 2 and a buffer area which is used as a tolerance of an electrical or mechanical error.

Figure 13:
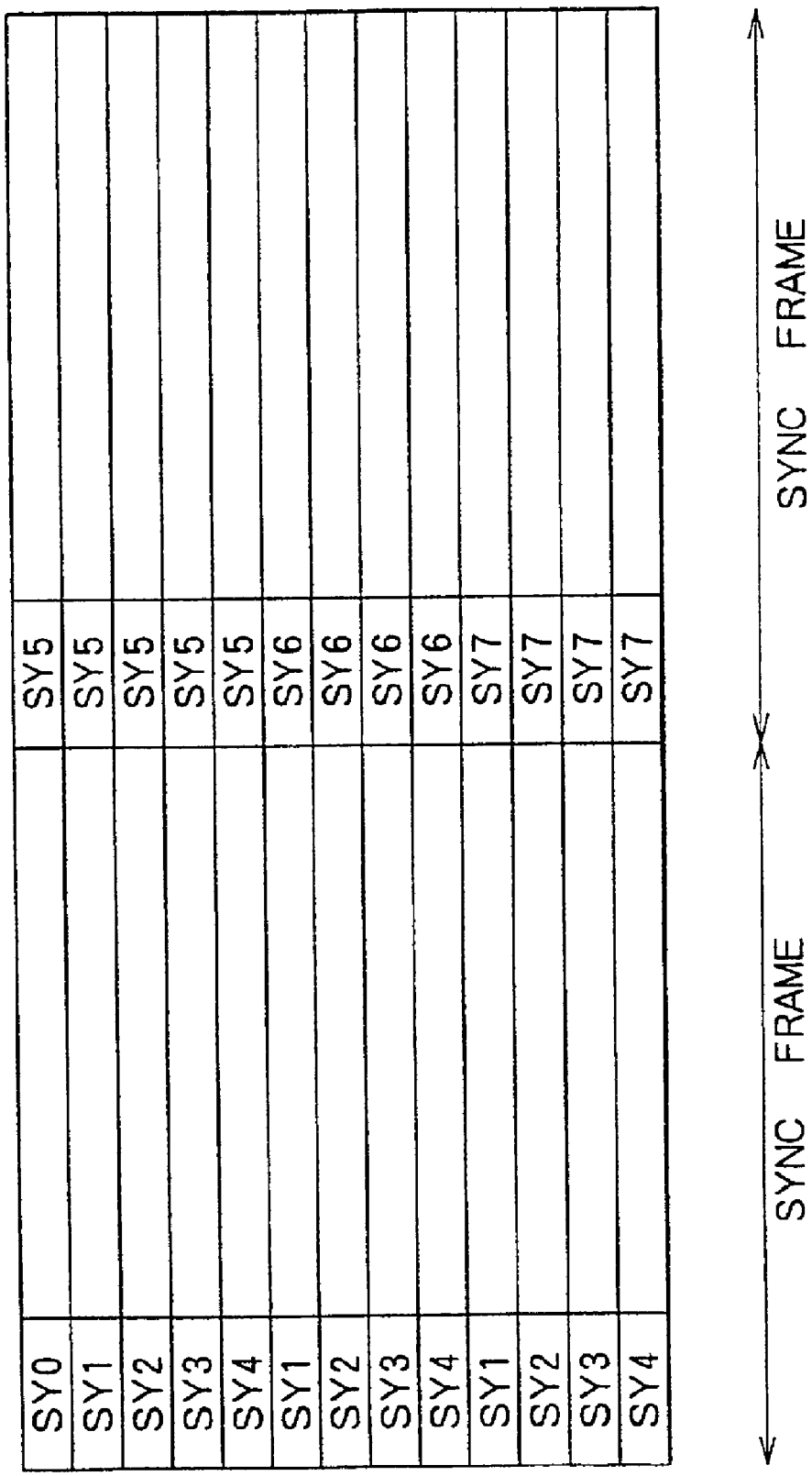
FIG. 13 is an explanatory diagram showing the structure of data recorded in a data area of a sector.
Figure 14:
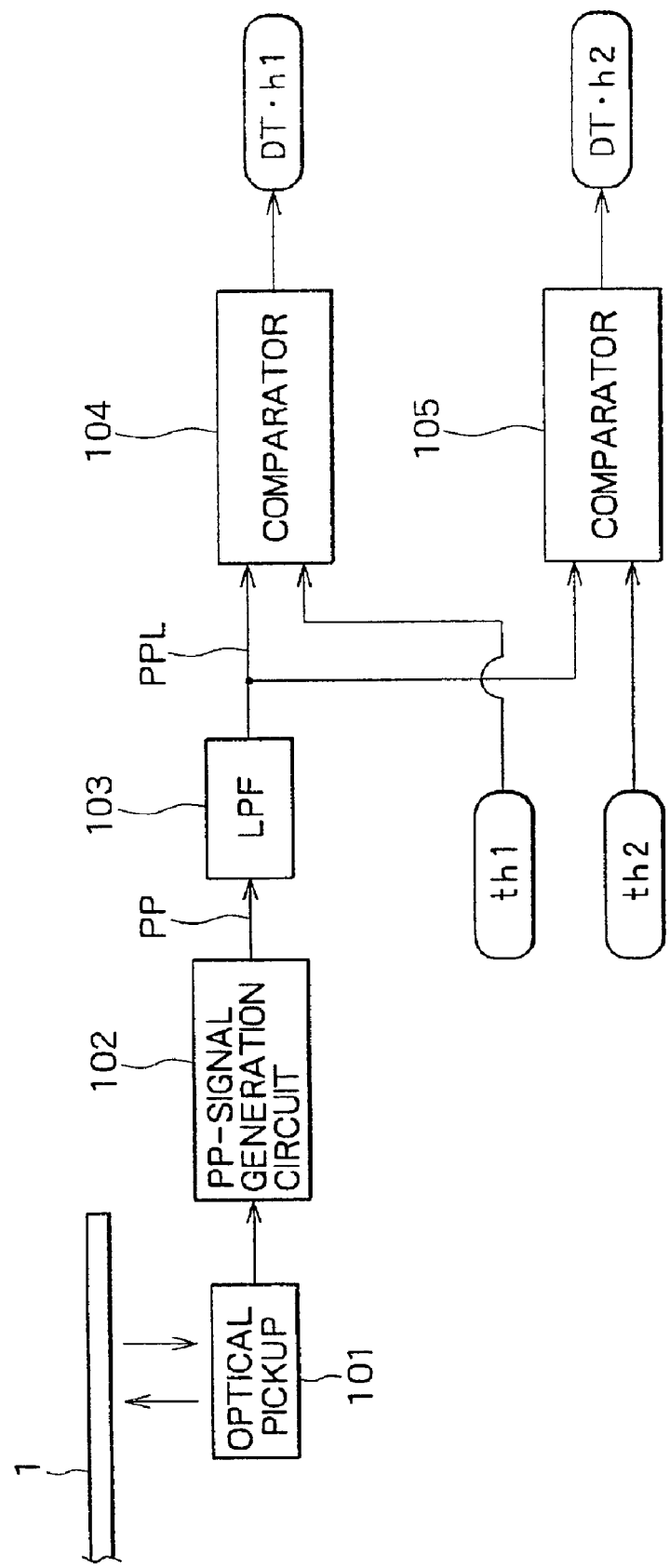
FIG. 14 is a block diagram showing a typical configuration for header detection carried out by the conventional disc drive apparatus.

Data recorded in the data area of a sector comprises 26 frames as shown in FIG. 13. Each of the frames starts with a frame sync. As shown in the figure, one of sync numbers SY0 to SY7 is assigned to each of the frames. The syntax of a sync number assigned to a frame indicates the position of the frame in the data area.

2: Configuration of the Disc Drive Apparatus

Figure 1:
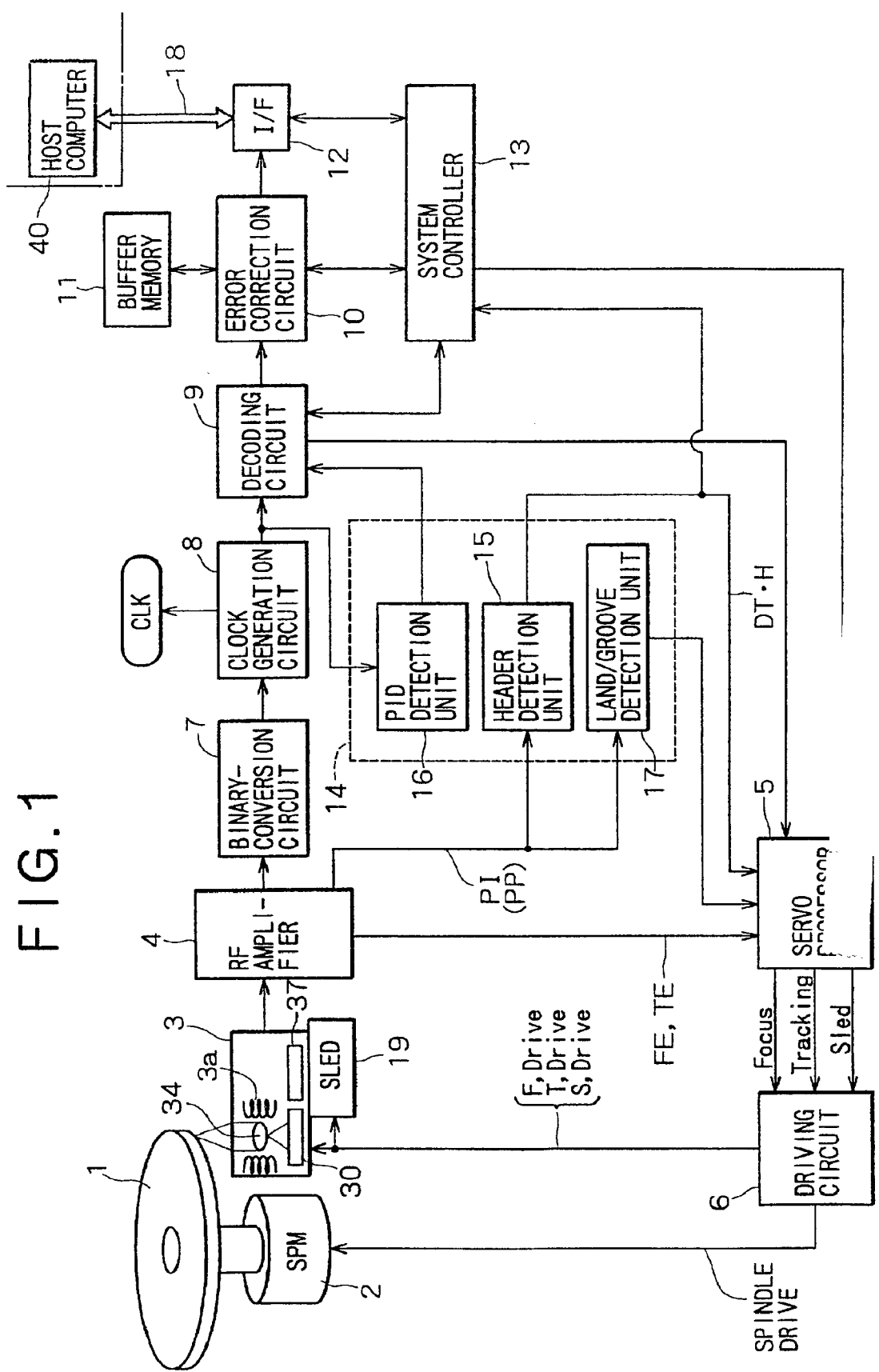
FIG. 1 is a block diagram showing a typical configuration of a disc drive apparatus implemented by an embodiment of the present invention.

The following description explains a typical configuration of a disc drive apparatus capable of playing back data from a DVD-RAM by referring to a block diagram of FIG. 1. It should be noted that, in actuality, the disc drive apparatus implemented by the embodiment is not limited to that capable of playing back data from a DVD-RAM but can be that also capable of playing back data from a DVD-ROM as well. In addition, the disc drive apparatus is capable of playing back data not only from a DVD, but also from a CD-DA (Digital Audio) and a CD-ROM.

In order to make the explanation easy to understand, however, only a configuration for playing back data from a DVD-RAM is mainly described. It should be noted that, in actuality, by changing a playback-signal processing system in the functional circuits described below in accordance with the type of the optical disc 1 and by modifying necessary parameters also in accordance with the type of the optical disc 1, the disc drive apparatus is capable of playing back data from the disc of the type.

An optical disc 1 serves as the DVD-RAM. The optical disc 1 is mounted on a turn table not shown in the figure. The turn table is driven into rotation by a spindle motor 2.

As a control technique to rotate the DVD-RAM, the so-called ZCAV (Zoned Constant Angular Velocity) method is adopted.

As is generally known, in conformity with the ZCAV method, the optical disc 1 is divided into a plurality of zones laid out in the radial direction of the optical disc 1. The number of sectors per track in a zone on the outer-circumference side is greater than that on the inner-circumference side. Control is executed so that a zone being traced is rotating at a CAV (Constant Angular Velocity). In order to make the linear velocity all but uniform for all zones over the entire surface of the optical disc 1, control needs to be executed to reduce the CAV as the tracing goes from a zone on the inner-circumference side to a zone on the outer-circumference side.

In an operation to read out data from the optical disc 1, a laser diode 30 employed in an optical pickup 3 radiates a laser beam to a signal surface of the optical disc 1. On the other hand, a photo detector 37 also employed in the optical pickup 3 detects a laser beam reflected by the signal surface to represent the data being read out.

In addition, in the optical pickup 3, an objective lens 34 serving as an output terminal of the laser beam is held by a 2-shaft mechanism 3a in such a way that the objective lens 34 can be moved in a tracking direction and a focus direction. The 2-shaft mechanism 3a comprises a focus coil for driving the objective lens 34 in a direction of departing from or approaching the optical disc 1 and a tracking coil for driving the objective lens 34 in the radial direction of the optical disc 1.

Furthermore, the optical pickup 3 as a whole can be moved by a sled mechanism 19 in the radial direction of the optical disc 1.

The reflected beam detected in the optical pickup 3 is converted into a current signal representing the light quantity of the reflected beam. The current signal is then supplied to an RF amplifier 4 for carrying out current-to-voltage conversion and matrix processing on the current signal in order to generate signals such as a focus-error signal FE, a tracking-error signal TE, an RF signal and a PI (pull in) signal. The RF signal is playback information and the PI signal is a sum signal to be described later.

The focus-error signal FE and the tracking-error signal TE, which generated by the RF amplifier 4 are supplied to a servo processor 5 for carrying out necessary processing such as phase compensation and gain adjustment. Signals generated by the servo processor 5 are supplied to a driving circuit 6. The driving circuit 6 supplies a focus drive signal and a tracking drive signal to the focus coil and the tracking coil respectively.

To put it in detail, the tracking-error signal TE is passed through an LPF (low-pass filter) to generate a sled-error signal supplied to the driving circuit 6 to be used for outputting a sled drive signal to a sled mechanism 14.

By carrying out the processing described above, focus servo control, tracking servo control and sled servo control can be executed.

In addition, the servo processor 5 also supplies signals for a focus-search operation and a track-jump operation to the driving circuit 6 in accordance with commands issued by a system controller 11. In accordance with the signals received from the servo processor 5, the driving circuit 6 generates the focus drive signal, the tracking drive signal and the sled drive signal, which drive the optical pickup 3 to carry out the focus-search operation and the track-jump operation.

The focus-search operation is an operation to detect the so-called S-character curve as the waveform of the focus-error signal FE while forcibly moving the objective lens 34 along a distance between a position farthest from the optical disc 1 and a position closest to the optical disc 1 for a focus-servo lead-in. As is generally known, the focus-error signal FE is observed to have a waveform of the S-character curve when the objective lens 34 is moving along a short distance centered at a point serving as a focus with respect to a recording layer of the optical disc 1. In the linear area corresponding to the S-character curve, the focus servo control is turned on, allowing the focus-servo lead-in. For such a focus-servo lead-in, a focus search is carried out. Thus, a focus drive signal flows through the focus coil to move the objective lens 34.

In the case of a track jump or a track access, the objective lens 34 is moved by the 2-shaft mechanism 3a in the radial direction of the optical disc 1 and the optical pickup 3 is moved by the sled mechanism 14 also in the radial direction of the optical disc 1. As drive signals in this case, the tracking drive signal and the sled drive signal are supplied to the tracking coil and the sled mechanism 14 respectively.

The playback RF signal generated by the RF amplifier 4 is supplied to a binary-conversion circuit 7 for carrying out binary conversion to produce the so-called EFM plus signal. The EFM plus signal is supplied to a clock playback circuit 8.

In the clock playback circuit 8, a PLL circuit and others extract, generate and output a playback clock signal CLK synchronized with the EFM plus signal supplied thereto from the EFM plus signal. The playback clock signal CLK is supplied to a variety of circuits such as mainly a decoding circuit 9 and the servo processor 5 as an operation clock signal. The EFM plus signal without the playback clock signal CLK is supplied to the decoding circuit 9. The EFM plus signal without the playback clock signal CLK is also supplied to a PID detection unit 16 employed in a RAM block 14 to be described later.

In the decoding circuit 9, the EFM plus signal supplied thereto is subjected to EFM-Plus demodulation (eight to fourteen demodulation plus or 8/16 demodulation). A signal obtained as a result of the demodulation is supplied to an error correction circuit 10.

The error correction circuit 10 carries out error correction according to an RS-PC technique by using a buffer memory 11 as a work area.

Binary-converted data completing the error correction, that is, playback data, is read out from the buffer memory 11 and output through a data interface unit 12 in the case of the configuration shown in this figure.

The data interface unit 12 is provided for interfacing the disc drive apparatus with an external apparatus such as a host computer 40 through an external data bus 18. When playback data is transferred as described above, the data interface unit 12 further passes on the data to the host computer 40 by way of the external data bus 18.

The disc drive apparatus is also capable of receiving a command from the host computer 40 by way of the data interface unit 12. In the disc drive apparatus, a command is received from the host computer 40 under control executed by a system controller 13.

The system controller 13 is a microprocessor serving as a member for controlling the whole operation of the disc drive apparatus. To be more specific, the system controller 13 executes necessary control to carry out a variety of playback operations on the basis of, among other factors, the present operating state and a command issued by the host computer 40.

In addition, in the disc drive apparatus implemented by this embodiment, as shown in the figure, there is provided the aforementioned RAM block 14 for use in an operation to play back data from the DVD-RAM. The RAM block 14 comprises a header detection unit 15, a PID detection unit 16 and land/groove detection unit 17.

The header detection unit 15 is a member for detecting a header. That is to say, the header detection unit 15 detects a timing with which the trace position of the laser beam is passing through a header area in the DVD-RAM. In detection of a header area, the header detection unit 15 resorts to a pull-in signal PI or a push-pull signal PP received from the RF amplifier 4, outputting a header detection signal DT·H to the servo processor 5 and the system controller 13.

On the basis of the header detection signal DT·H received from the header detection unit 15, the servo processor 5 holds a tracking-servo control operation during the header playback period. That is to say, typically, the servo processor 5 executes tracking servo control based on a closed loop by holding a tracking-error signal TE immediately preceding detection of the header area. Thus, in this tracking servo control, the header area's tracks of the pit arrays representing addresses are not traced. As described earlier, the tracks in the header area are shifted by ½ track pitches from the track of a recordable area following the header area. As a result, the land track or the groove track of the recordable area can be traced well.

In addition, the system controller 13 is also capable of executing control to switch predetermined playback parameters from ones suitable for a header area to others suitable for a recordable area and vice versa. This control is executed by outputting control signals for switching the playback parameters to predetermined functional circuits such as mainly the decoding circuit 9.

For example, when receiving the header detection signal DT·H from the header detection unit 15, the system controller 13 executes control to switch the playback parameters to those suitable for a header area and keep the playback parameters suitable for a header area during the playback period of the header area.

The PID detection unit 16 detects PID1, PID2, PID3 and PID4, which each represent a physical address, from a header area. In order to detect a PID, the PID detection unit 16 must detect an address mark preceding the PID and outputs a PID signal based on the detection to the decoding circuit 9. The decoding circuit 9 carries out EFM plus demodulation to decode the PID signal received from the PID detection unit 16. As a result of the demodulation, data of the PID is obtained. By utilizing a PID obtained by the decoding circuit 9 in this way, the system controller 13 or any other member is capable of recognizing the physical address of a recordable area following the header area containing the PID.

As has been described by referring to FIG. 10, when tracing of the track on the DVD-RAM continues from a round to a next one, the track is changed alternately from a land to a groove or vice versa. Thus, in a playback operation, it is necessary to form a judgment as to whether a recordable area is a land or a groove. This is because it is necessary to set the tracking-error signal TE used in the tracking servo control at a polarity depending on whether the recordable area is a land or a groove.

The land/groove detection unit 17 is a member for forming a judgment as to whether a recordable area is a land or a groove. In the formation of such a judgment, the land/groove detection unit 17 resorts to a push-pull signal PP received from typically the RF amplifier 4.

When the header area in a sector of a land track is detected in an operation to trace the land track, waveform portion 1 of the push-pull signal PP observed during the tracing of the 2 pit arrays PID1 and PID2 in the first half of the header area is the inversion of waveform portion 2 of the push-pull signal PP observed during the tracing of the 2 pit arrays PID3 and PID4 in the second half of the header area as shown in FIGS. 15A to 15C. By the same token, when the header area in a sector of a groove track is detected in an operation to trace the groove track, waveform portion 3 of the push-pull signal PP observed during the tracing of the 2 pit arrays PID1 and PID2 in the second half of the header area is the inversion of waveform portion 4 of the push-pull signal PP observed during the tracing of the 2 pit arrays PID3 and PID4 in the first half of the header area also as shown in FIGS. 15A to 15C. In addition, waveform portion 1 is opposite to waveform portion 3 and waveform portion 2 is thus opposite to waveform portion 4. Thus, by recognizing whether the inversion is from a positive polarity to a negative polarity or from a negative polarity to a positive polarity, it is possible to univocally form a judgment as to whether a recordable area following a header area is a groove or land track. The land/groove detection unit 17 therefore examines the push-pull signal PP to recognize the pattern of inversion of the waveform observed during the tracing of a header area, and outputs a detection signal indicating whether the track being traced is a groove or land track on the basis of a result of the inversion-pattern recognition. The detection signal is supplied to typically the servo processor 5 which then inverts the polarity of the tracking-error signal TE with a proper timing as described above.

It should be noted that there is a variety of conceivable ways of determining whether a track being traced is a land or groove track. For example, a track being traced can be determined to be a land or groove track from a result of decoding of PIDs or from a periodical characteristic of the disk rotation. Thus, the land/groove detection unit 17 is not limited to the configuration described above.

The following description explains a typical configuration of an optical system provided for playing back data from the DVD-RAM.

Figure 2:
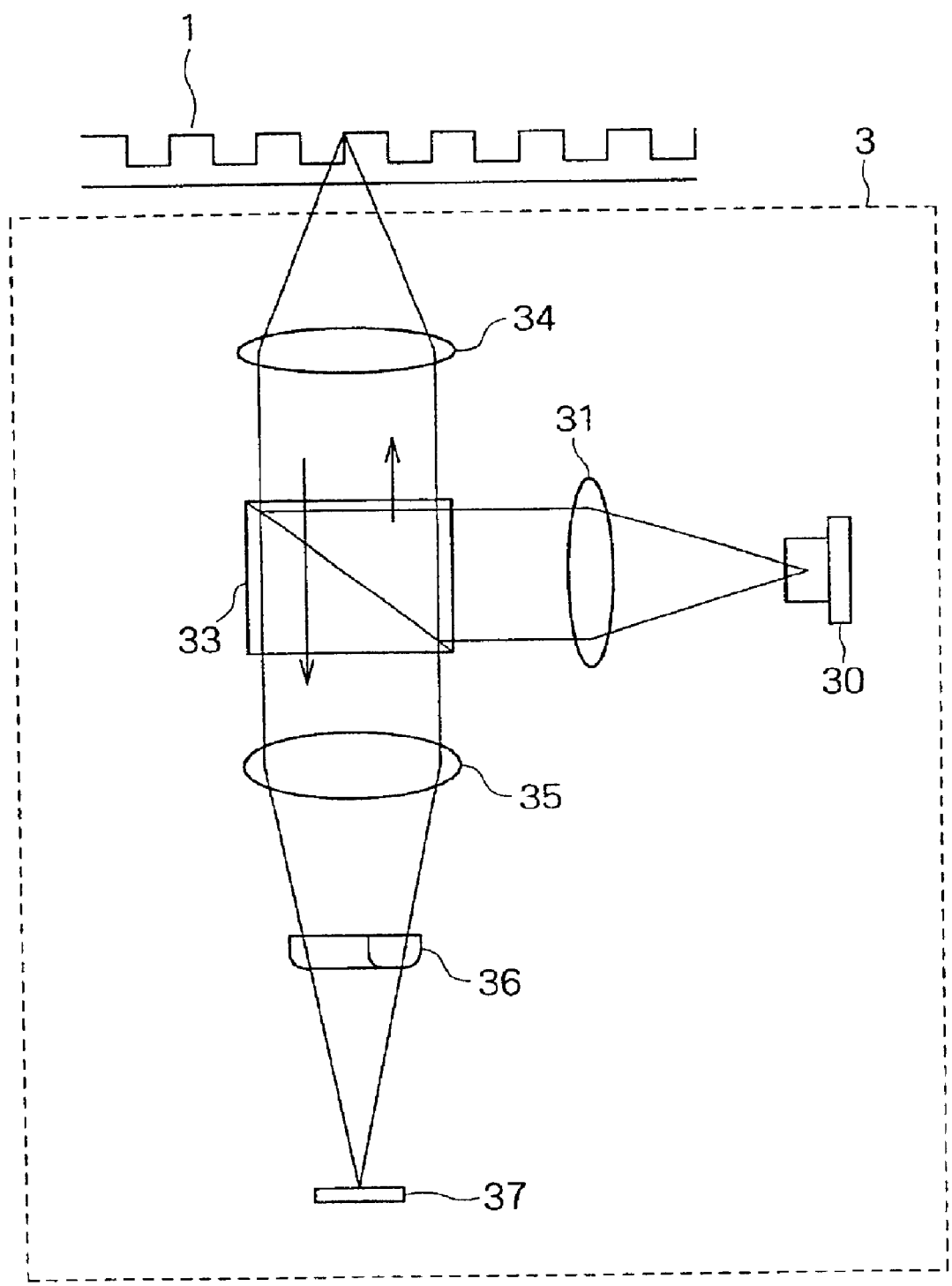
FIG. 2 is a conceptual diagram showing a typical configuration of an optical system in the disc drive apparatus implemented by the embodiment.

FIG. 2 is a diagram showing the configuration of the optical system in the optical pickup 3.

In the optical system shown in the figure, a laser beam output by the laser diode 30 is converted by a collimator lens 31 into parallel beams which are directed to a beam splitter 33. The laser beams are reflected by the beam splitter 33, changing their direction by 90 degrees. When passing through the objective lens 34, the laser beams are converted, being radiated to the optical disc 1.

The laser beams radiated by the optical disc 1 reach a convergence lens 35 by way of the objective lens 34 and the beam splitter 33. The laser beams are converged by the convergence lens 35, being radiated to the photo detector 37 by way of a cylindrical lens 36.

On the assumption that the application is an operation to play back data from an HD layer conforming to DVD specifications as described above, the laser diode 30 radiates a laser beam with a center wavelength of 650 nm and the objective lens 34 has an NA of 0.6.

Figure 3:
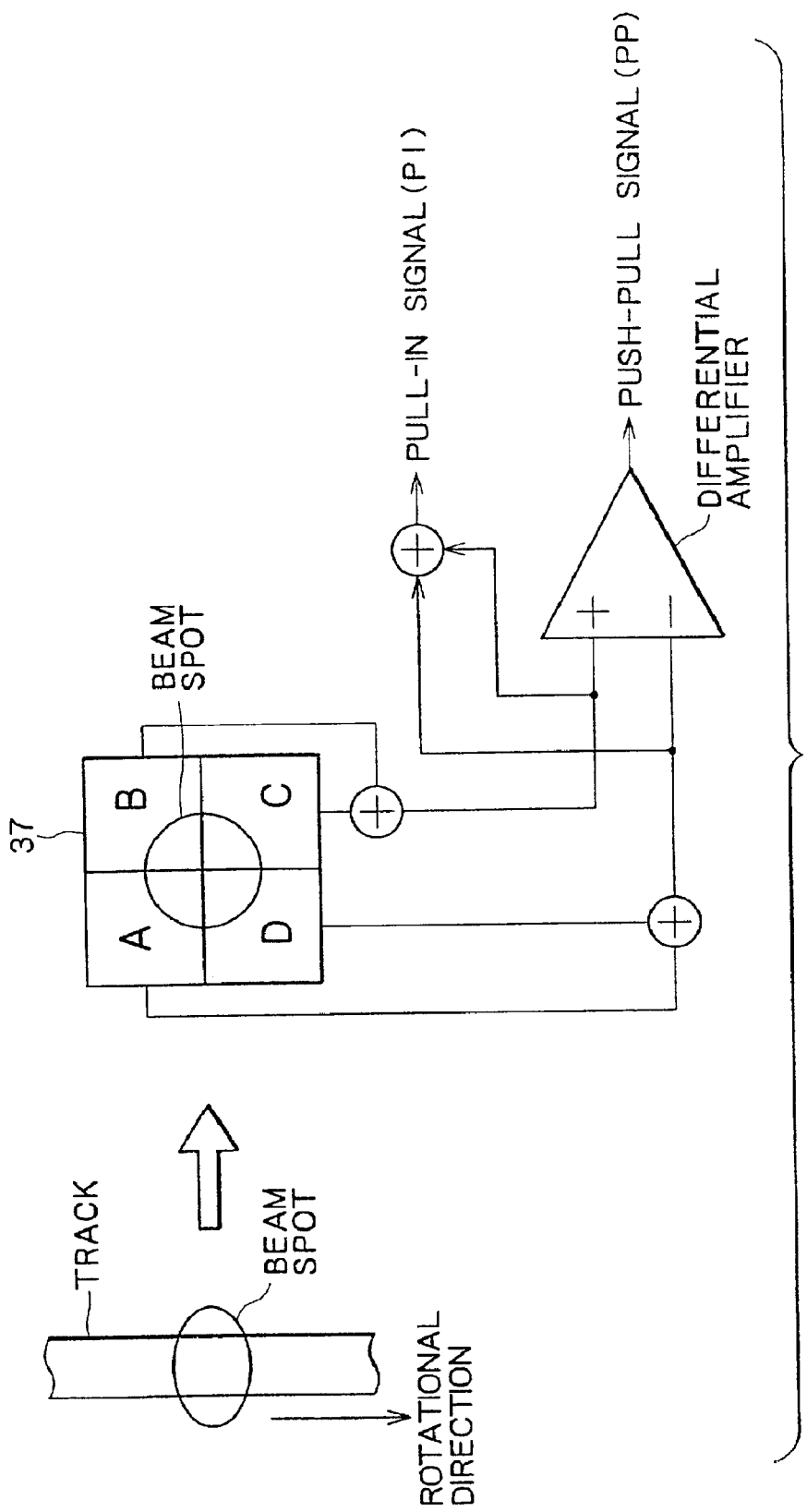
FIG. 3 is an explanatory diagram showing a photo detector and a technique of generating detection signals in the disc drive apparatus implemented by the embodiment.

FIG. 3 is a diagram showing a typical configuration of the photo detector 37.

As shown in the figure, the photo detector 37 comprises at least 4 partial detectors, namely, detection portions A, B, C and D. The detection portions A, B, C and D are laid out in such a way that the detection portions A and B receive a reflected beam from the same beam spot whereas the detection portions C and D receive a reflected beam from the same beam spot on the downstream side of the rotating direction as shown in the diagram on the left side of the figure.

It should be noted that detection signals obtained from the detection portions A, B, C and D are referred to as detection signals A, B, C and D respectively in the following description.

This embodiment adopts a configuration wherein a pull-in signal is used for detection of a header as will be described later. As is obvious from an equivalent circuit shown in the figure, the pull-in signal PI is obtained as a result of processing PI=(A+B+C+D) carried out on the detection signals A, B, C and D generated by the detection portions A, B, C and D respectively.

For the DVD-RAM, the so-called push-pull technique is adopted as tracking-servo control. In accordance with this technique, the push-pull signal PP cited before is used for execution of the tracking-servo control. As is also obvious from an equivalent circuit shown in the figure, the push-pull signal PP is generated by a differential amplifier as a result of processing PP=(A+D)−(B+C) carried out on the detection signals A, B, C and D generated by the detection portions A, B, C and D respectively. It should be noted that, for a DVD-ROM, a phase-difference technique is adopted.

The focus-error signal FE is generated as a result of processing FE=(A+C)−(B+D) carried out on the detection signals A, B, C and D generated by the detection portions A, B, C and D respectively. This processing is not shown in the figure though.

It should be noted the pieces of processing for generating the signals described above is actually carried out by the RF amplifier 4.

3: Configuration of the Header Detection Unit 3-1: First Implementation

The disc drive apparatus implemented by the implementation is characterized by the configuration of the header detection unit 15 employed in the RAM block 14 shown in FIG. 1. For this reason, the configurations of the header detection unit 15 as implemented by some implementation, namely, the first to third implementation, are explained.

The description begins with an explanation of the configuration and the operation of the header detection unit 15 implemented by the first implementation.

Figure 4:
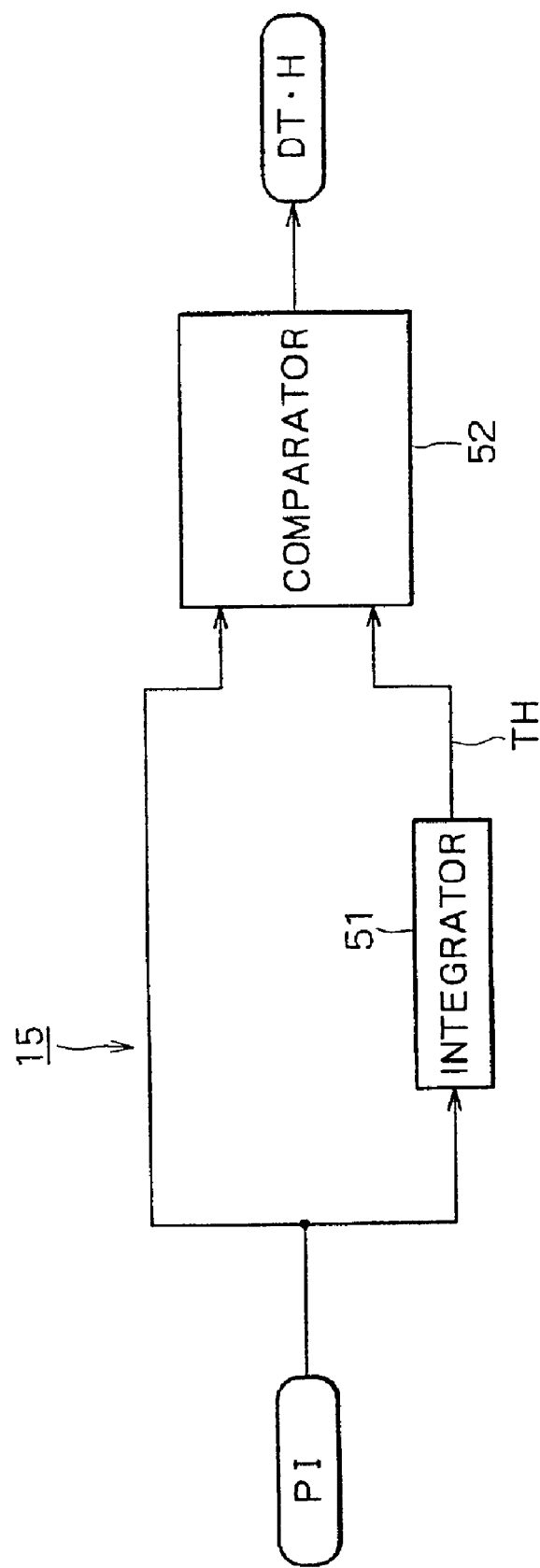
FIG. 4 is a block diagram showing the configuration of a first implementation implementing a header detection unit employed in the disc drive apparatus implemented by the embodiment.

FIG. 4 is a block diagram showing the configuration and the operation of the header detection unit 15 implemented by the first implementation.

As shown in the figure, the header detection unit 15 implemented by the first implementation receives the pull-in signal PI generated by the RF amplifier 4. To confirm what is described earlier, the pull-in signal PI is obtained as a result of processing PI=(A+B+C+D) carried out on the detection signals A, B, C and D generated by the detection portions A, B, C and D of the photo detector 37 respectively as shown in FIG. 3. The pull-in signal PI represents the total quantity of a light reflected by the signal surface of the optical disc The pull-in signal PI is supplied to an integrator 51 and a comparator 52 as a comparison signal. The integrator 51 has a predetermined time constant, almost averaging the level of the pull-in signal PI supplied thereto. The integration output obtained as a result of integration of the pull-in signal PI is supplied to the comparator 52 as a threshold value TH.

The comparator 52 compares the pull-in signal PI received as a comparison signal with the threshold value TH. If the level of the pull-in signal PI exceeds the threshold value TH, the comparator 52 outputs a signal at an H level. If the level of the pull-in signal PI does not exceed the threshold value TH, on the other hand, the comparator 52 outputs a signal at an L level. The signal output at an H level is the header detection signal DT·H indicating the header period as described above.

FIGS. 5A to 5D are timing charts of the operation of the header detection unit 15 with the configuration shown in FIG. 4.

Figure 5:
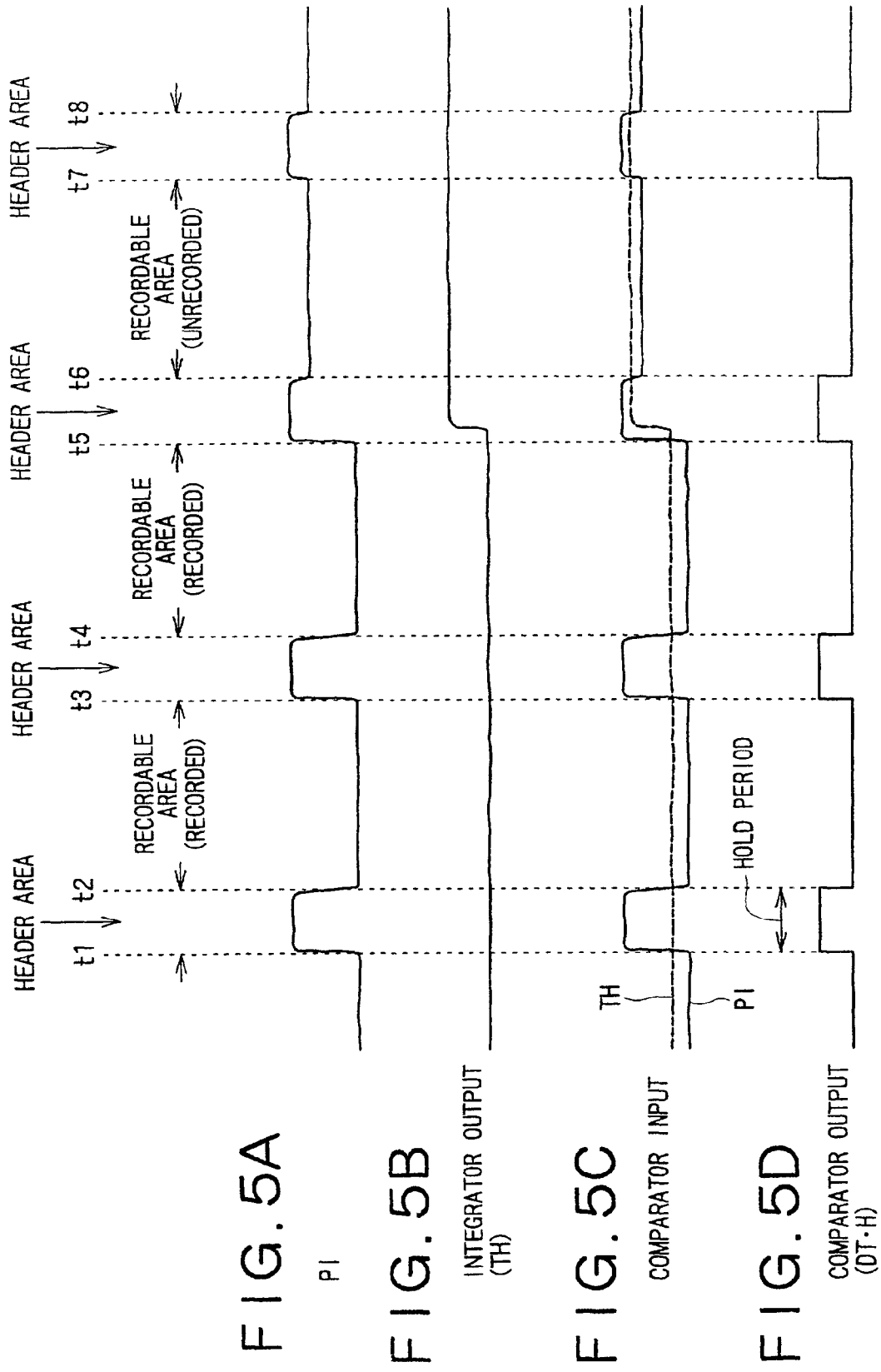
FIGS. 5A to 5D are timing charts of the operation of the header detection unit implemented by the first implementation.

FIG. 5A shows the waveform of the pull-in signal PI obtained in an operation to play back data from the optical disc 1 serving as a DVD-RAM. As the figure indicates, the optical reflectance of the header area is different from that of the recordable area. To be more specific, the former is higher than the latter. As a result, during periods t1 to t2, t3 to t4, t5 to t6 and t7 to t8 which are shown in FIG. 5A, that is, during periods header areas are being traced, the level of the pull-in signal PI increases approximately to an all but fixed level. During periods t2 to t3, t4 to t5 and t6 to t7, that is, during periods recordable areas are being traced, on the other hand, the level of the pull-in signal PI decreases approximately to another all but fixed level lower than the level for the header areas.

As for a recordable area, the optical reflectance of an area with already recorded data is different from that an area with unrecorded data. To be more specific, the former is lower than the latter. For this reason, as shown in FIG. 5A, the level of the pull-in signal PI observed during the period t2 to t3 corresponding to an area with already recorded data is lower that of the pull-in signal PI observed during the period t6 to t7 corresponding to an area with unrecorded data.

The threshold value TH generated by the integrator 51 integrating the pull-in signal PI is shown in FIG. 5B. As is obvious from the figure, the threshold value TH has a smooth waveform representing approximately an average of the level of the pull-in signal PI shown in FIG. 5A due to the fact that the integrator 51 has a relatively large time constant. That is to say, protruding levels of the pull-in signal PI, which are observed in the header areas, are averaged with the pull-in signal PI's lower levels observed in the recordable areas to result in a waveform with a level slightly higher than the lower levels by an all but fixed difference.

As described above, the level of the pull-in signal PI observed in an area with already recorded data is lower that of the pull-in signal PI observed in an area with unrecorded data. Since the threshold value TH is the result of integration of the pull-in signal PI, the level of the threshold value TH observed during the period t1 to t5 corresponding to recordable areas sectors each with already recorded data is lower that of the pull-in signal PI observed during the period after t5 corresponding to recordable areas of sectors each with unrecorded data as shown in FIG. 5B. That is to say, the level of the threshold value TH also varies to follow average-level variations of the pull-in signal PI which depend on whether or not data has been recorded in the recordable area.

Then, the comparator 52 compares the pull-in signal PI with the threshold value TH as shown in FIG. 5C. It should be noted that, in FIG. 5C, the threshold value TH is represented by a dashed line.

As is obvious from the figure, the level of the threshold value TH is higher than the level of the pull-in signal PI during the a period the laser-beam spot is passing through a recordable area but lower than the level of the pull-in signal PI during the a period the laser-beam spot is passing through a header area.

Thus, as shown in FIG. 5D, the header detection signal DT·H output by the comparator 52 is set at the H level during the periods t1 to t2, t3 to t4, t5 to t6 and t7 to t8, which approximately coincide with the periods the laser-beam spot is passing through header areas.

In the conventional configuration for detecting a header area as described earlier by referring to FIG. 14 and FIGS. 15A to 15C, the threshold values th1 and th2 are fixed and hence incapable of following an offset inadvertently added to the push-pull signal PP serving as a source signal for detecting a header area. Thus, the probability of incorrect detection described by referring to FIGS. 16A to 16C is extremely high.

In the configuration for detecting a header area as described by referring to FIG. 4 and FIGS. 5A to 5D, on the other hand, the threshold value TH follows variations in level which are caused by offsets inadvertently added to the pull-in signal PI serving as a source signal for detecting a header area. Thus, the threshold value TH can be sustained at a proper level almost all the time. As a result, the probability of incorrect detection can be suppressed substantially in comparison with the conventional configuration.

In addition, for example, the servo processor 5 holds the tracking servo control with a timing of a hold period in which the header detection signal DT·H supplied to the servo processor 5 is set at the H level. Since this implementation is capable of detecting a header area with a high degree of accuracy as described above, the operation to hold the tracking servo control can also be more accurately carried out during a period the laser-beam spot is passing through a header area.

3-2: Second Implementation

Next, a second implementation implementing the header detection unit 15 is explained.

Figure 6:
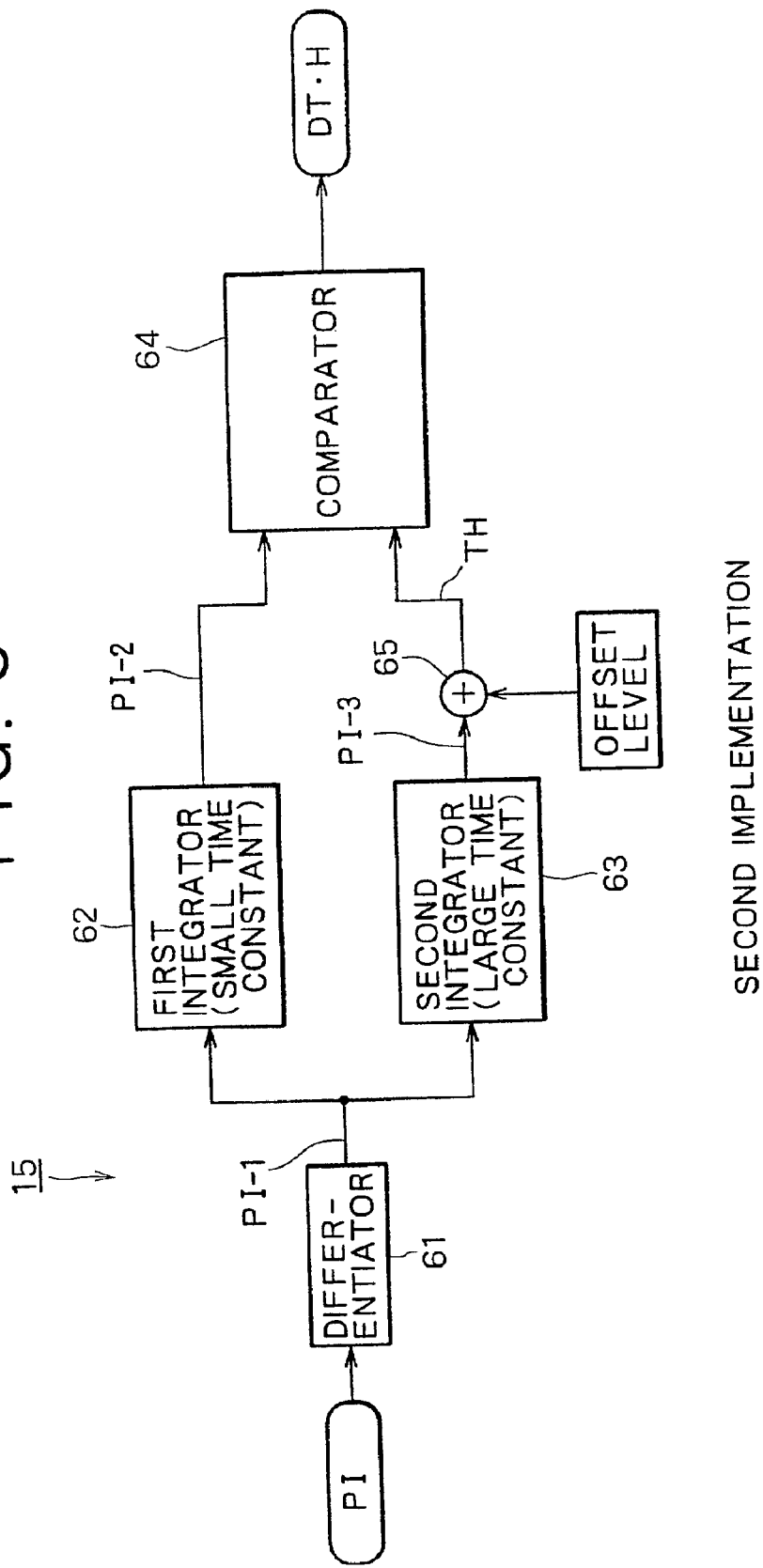
FIG. 6 is a block diagram showing the configuration of a second implementation implementing the header detection unit employed in the disc drive apparatus implemented by the embodiment.

FIG. 6 is a diagram showing the configuration of the header detection unit 15 implemented by the second implementation. Also in the case of the second implementation, the pull-in signal PI serves as a source signal for detecting a header area.

The pull-in signal PI output by the RF amplifier 4 is supplied to a differentiator 61. A pull-in signal PI-1 having a differentiation waveform generated by the differentiator 61 is supplied to a first integrator 62 and a second integrator 63.

The first integrator 62 has a predetermined time constant different from that of the second integrator 63. To be more specific, the first integrator 62 has a time constant smaller than that of the second integrator 63.

An integrator output PI-2 generated by the first integrator 62 is supplied to a comparator 64 as a comparison signal. On the other hand, an integrator output PI-3 generated by the second integrator 63 is supplied to an adder 65.

The adder 65 adds an offset value set in advance to the integrator output PI-3 so as to provide the integrator output PI-3 with an offset having a predetermined level. The sum of the integrator output PI-3 and the level is used as the threshold value TH which is supplied to the comparator 64.

The comparator 64 compares the level of the integrator output PI-2 generated by the first integrator 62 with the threshold value TH. Also in this case, if the level of the integrator output PI-2 is higher than the threshold value TH, the comparator 64 sets the header detection signal DT·H at the H level. If the level of the integrator output PI-2 is lower than the threshold value TH, on the other hand, the comparator 64 sets the header detection signal DT·H at the L level.

The following description explains the operation of the header detection unit 15 having the configuration shown in FIG. 6 with reference to timing charts of FIGS. 7A to 7D.

Figure 7:
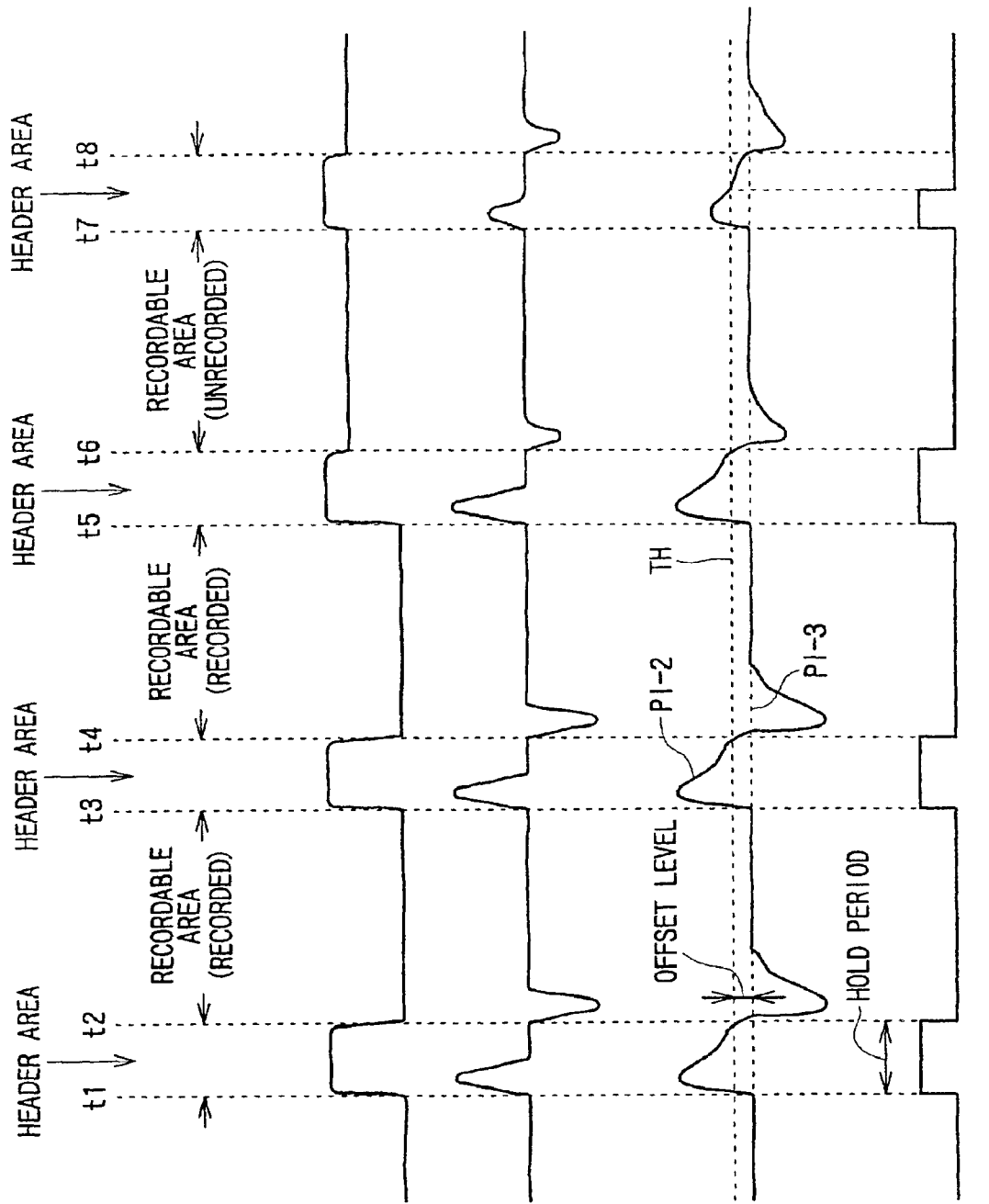
FIGS. 7A to 7D are timing charts of the operation of the header detection unit implemented by the second implementation.

In this configuration, the pull-in signal PI received to serve as a source signal for detecting a header area is shown in FIG. 7A. As shown in the figure, the pull-in signal PI has the same waveform as that shown in FIG. 5A.

The differentiator output PI-1 generated by the differentiator 61 as a result of differentiation of the pull-in signal PI is shown in FIG. 7B. As shown in the figure, the differentiator output PI-1 has a waveform with differentiation pulses appearing at the start and end positions of each header area. This is because, at the start and end positions of each header area, the waveform changes of the pull-in signal PI are large as shown in FIG. 7A. At the start position of a header area coinciding with a time t1, for example, the pull-in signal PI abruptly rises. Thus, as a part of the differentiator output PI-1, a differentiation pulse having a positive polarity is observed at the time t1. At the end position of the header area coinciding with a time t2 following the time t1, on the other hand, the pull-in signal PI abruptly falls. Thus, as a part of the differentiator output PI-1, a differentiation pulse having a negative polarity is observed at the time t2.

Data has been recorded in a recordable area preceding the time t1 and a recordable area succeeding the time t2, causing these recordable areas each to exhibit a low optical reflectance. On the other hand, no data has been recorded in a recordable area preceding the time t7 and a recordable area succeeding the time t8. Nevertheless, as a part of the differentiator output PI-1, a differentiation pulse having a positive polarity is observed at the time t7, and, as a part of the differentiator output PI-1, a differentiation pulse having a negative polarity is observed at the time t8 as shown in FIG. 7B. Since the waveform changes of the pull-in signal PI at the times t7 and t8 are smaller than the waveform changes of the pull-in signal PI at the times t1 and t2 respectively as shown in FIG. 7A, the levels of the differential pulses observed at the times t7 and t8 are lower than the levels of the differential pulses observed at the times t1 and t2 respectively as shown in FIG. 7B.

The differentiator output PI-1 generated as described above is supplied to the first integrator 62 and the second integrator 63.

Due to the time constant set in the first integrator 62, a first integrator output PI-2 generated by the first integrator 62 as a result of integration of the differentiation pulses of the differentiator output PI-1 is pulses each having a gradual fall edge and a greater width as shown in FIG. 7C. It should be noted that the width of each positive-polarity pulse of the first integrator output PI-2 is determined by the time constant set in the first integrator 62 at such a value that the width is extended approximately over a hold period during which the laser-beam spot is passing through a header area. For example, the first positive-polarity pulse of the first integrator output PI-2 approximately coincides with the hold period t1 to t2.

On the other hand, a larger time constant is set in the second integrator 63 so that a second integrator output PI-3 generated by the second integrator 63 as a result of integration of the differentiation pulses of the differentiator output PI-1 is a waveform averaging the levels of the differentiation pulses of the differentiator output PI-1, that is, a waveform with the differentiation pulses of the differentiator output PI-1 almost eliminated. The second integrator output PI-3 is the first integrator output PI-2 shown in FIG. 7C except that the widened integration pulses are eliminated from PI-2 to result in an average waveform represented by a lower flat dashed line in FIG. 7C. As shown in FIG. 7C, in actuality, the level of the lower dashed line representing the second integrator output PI-3 is made slightly higher than the level of the flat portion of the first integrator output PI-2.

As the threshold value TH compared by the comparator 64 with the first integrator output PI-2, the second integrator output PI-3 can be used to detect a header area. Since the level of the second integrator output PI-3 is only slightly higher than the level of the flat portion of the first integrator output PI-2, however, it is quite within the bounds of possibility that an inadvertent variation in level occurring to a certain degree on the flat portion of the first integrator output PI-2 exceeds the difference in level between the second integrator output PI-3 and the flat portion of the first integrator output PI-2. In this case, the variation is interpreted incorrectly as detection of a header area.

In order to improve the reliability of the header detection in this implementation, an offset value is added by the adder 65 to the second integrator output PI-3 as shown in FIG. 6. The sum of the offset value and the second integrator output PI-3 is taken as the threshold value TH which is represented by an upper flat dashed line in FIG. 7C.

As is obvious from the figure, the threshold value TH has a level higher than the flat portion of the first integrator output PI-2 by the offset value added to the integrator output PI-3 so that it is out of the bounds of possibility that the flat portion of the first integrator output PI-2 exceeds the threshold value TH.

The comparator 64 compares the first integrator output PI-2 shown in FIG. 7C with the threshold value TH. In the period t1 to t2, for example, the widened positive-polarity pulse of the first integrator output PI-2 exceeds the level of the threshold value TH. Thus, with a timing coinciding with this period, the signal DT·H is set at the H level to indicate a header area as shown in FIG. 7D. By the same token, with timings coinciding with periods t3 to t4 and t5 to t6, the signal DT·H is set at the H level to correctly indicate a header area for each of the periods.

A period to set the signal DT·H at the H level is used as a hold period in which the tracking-servo control is held.

In such a configuration, a source signal used for detection of a header area is differentiated and the detection of a header area is based on a waveform obtained as a result of the differentiation. Differentiation of a signal serving as a base of header-area detection is no more than an emphasis placed on changes in source-signal level on a boundary between a header area and a recordable area. Since the emphasized change in level is used for comparison of signal levels, the accuracy of the header detection is improved.

Also in the case of the second implementation, the threshold value TH is obtained by differentiation of a source signal, integration of a differentiator output PI-1 obtained as a result of the differentiation and addition of an offset to a second integrator output PI-3 obtained as a result of the integration with a relatively a large time constant wherein the offset is greater than variations in flat level of a first integrator output PI-2 obtained as a result of the integration with a relatively a small time constant. The threshold value TH is compared by the comparator 64 with the first integrator output PI-2.

As shown in FIGS. 7A to 7D, no data has been recorded in a recordable area preceding the time t7 and a recordable area succeeding the time t8. Thus, in this implementation, the peak level of each widened integration pulse of the first integrator output PI-2 also becomes lower as well. As a result, the period of setting the signal DT·H at the H level between the times t7 and t8 ends at a time earlier than the time t8 as shown in FIG. 7D. That is to say, the hold period corresponding to the period of setting the signal DT·H at the H level becomes shorter than the supposed value corresponding to the actual length of the header area.

In order to solve this problem, in the second implementation, the hold period can also be measured by monitoring the lapse of time since the rising edge of the signal DT·H to the H level. As the monitored lapse of time becomes equal to the length of a time required by the laser-beam spot to pass through a header area at the current linear velocity, for example, the hold period is terminated. By doing so, the tracking-servo control can be held with a proper timing corresponding to the period of the laser-beam spot's tracing a header area even if the signal DT·H is output only during a short period between the times t7 and t8 as shown in FIG. 7D.

3-3: Third Implementation

Next, a third implementation implementing the header detection unit 15 is explained.

Figure 8:
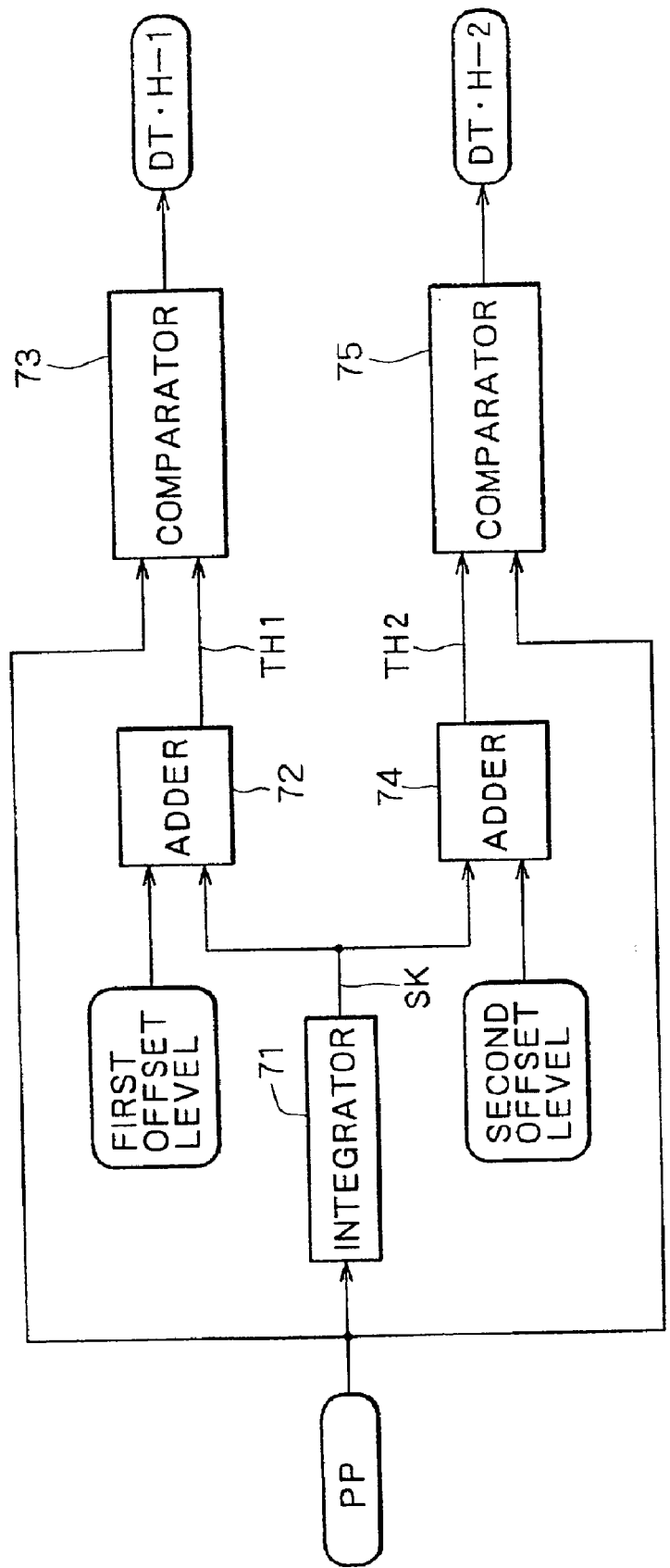
FIG. 8 is a block diagram showing the configuration of a third implementation implementing the header detection unit employed in the disc drive apparatus implemented by the embodiment.

FIG. 8 is a block diagram showing the configuration of the header detection unit 15 implemented by the third implementation. As shown in the figure, in the case of the third implementation, the push-pull signal PP is used as the source signal in place of the pull-in signal PI. As shown in FIG. 3, the push-pull signal PP is generated as a difference between detection signals generated by 2 detection halves resulting from division of a photo detector by a dividing line oriented in parallel to the track direction.

The push-pull signal PP is supplied to an integrator 71, a comparator 73 and a comparator 75, which are employed in the header detection unit 15.

The integrator 71 integrates the push-pull signal PP and generates an integration output as a result of integration.

The push-pull signal PP supplied to the integrator 71 has a waveform which varies in accordance with a lapse of time, as shown in FIG. 9B. As shown in the figure, the waveform of the push-pull signal PP is smooth during a period corresponding to a recordable area but includes a polarity-inversion pattern, which is alternately pulsative in the positive-polarity and negative-polarity directions, during a period corresponding to a header area. As described earlier, the polarity of the pattern is inverted due to the fact that pit arrays of PID1 and PID2 are placed at locations shifted from the center line of the groove track by ½ track pitches in the direction toward a circumference on the outer side while pit arrays of PID3 and PID4 are placed at locations shifted from the center line of the groove track by ½ track pitches in the direction toward a circumference on the inner side. In addition, the inversion of the polarity can be from the positive polarity to the negative polarity or from the negative polarity to the positive polarity in dependence on whether the recordable area following the header area is a land track or a groove track.

The integrator output Sk generated by the integrator 71 as a result of integration of the push-pull signal PP is shown in FIG. 9A. By comparison of the waveform of the integrator output Sk with the waveform of the push-pull signal PP shown in FIG. 9B, it is obvious that the integrator output Sk has a waveform wherein the polarity-inversion pattern in the header area is averaged and, hence, all but removed.

The integrator output Sk generated by the integrator 71 to have such a waveform is supplied to adders 72 and 74. The adder 72 adds a first predetermined offset to the integrator output Sk. On the other hand, the adder 74 adds a second predetermined offset to the integrator output Sk. The first offset is positive while the second one is negative. The outputs of the adders 72 and 74 are used as first and second threshold values TH1 and TH2 respectively.

FIG. 9A shows the integrator output Sk, the first threshold value TH1 and the second threshold value TH2. As explained earlier, the first threshold value TH1 is higher than the integrator output Sk by the first offset. On the other hand, the second threshold value TH2 is lower than the integrator output Sk by the second offset.

As shown in FIG. 8, the comparator 73 compares the push-pull signal PP received as a comparison signal with the first threshold value TH1 received from the adder 72. The comparison itself is shown in FIG. 9B. As shown in this figure, the waveform of the push-pull signal PP includes an approximately rectangular portion having a positive polarity during a period corresponding to a header area as an object of detection of the comparator 73. When the comparator 73 detects a state in which the approximately rectangular portion having a positive polarity (or the waveform portion serving as the object of detection) exceeds the first threshold value TH1, a first header detection signal DT·H-1 is set at the H level as shown in FIG. 9C. The first header detection signal DT·H-1 set at the H level indicates either the header area's pit arrays PID1 and PID2 or pit arrays PID3 and PID4.

As shown in FIG. 8, the comparator 75 on the other hand compares the push-pull signal PP received as a comparison signal with the second threshold value TH2 received from the adder 74. The comparison itself is shown in FIG. 9B. As shown in this figure, the waveform of the push-pull signal PP includes an approximately rectangular portion having a negative polarity during a period corresponding to a header area as an object of detection of the comparator 75. When the comparator 75 detects a state in which the approximately rectangular portion having a negative polarity (or the waveform portion serving as the object of detection) exceeds the second threshold value TH2, a second header detection signal DT·H-2 is set at the H level as shown in FIG. 9D. The second header detection signal DT·H-2 set at the H level indicates the pit arrays PID1 and PID2 of a header area if the first header detection signal DT·H-1 set at the H level indicates the pit arrays PID3 and PID4 of the same header area. On the other hand, the second header detection signal DT·H-2 set at the H level indicates the pit arrays PID3 and PID4 of a header area if the first header detection signal DT·H-1 set at the H level indicates the pit arrays PID1 and PID2 of the same header area.

A period between the rising edge of the first header detection signal DT·H-1 and the falling edge of the second header detection signal DT·H-2 is the hold period. By holding the tracking-servo control during this period, an accurate operation can be carried out for the actual header area.

Also in the configuration described above, since the generation of the first and second threshold values TH1 and TH2 is based on a signal obtained as a result of integration of the push-pull signal PP serving as a source signal, even if an offset is inadvertently added to the push-pull signal PP, the first and second threshold values TH1 and TH2 will each exhibit a level following level variations of the push-pull signal PP. Thus, also with this configuration, a header area can be detected with a higher degree of precision than the conventional configuration.

In addition, in the case of this configuration, the waveform portion of the push-pull signal PP for the pit arrays PID1 and PID2 in a header area is the inversion of the waveform portion of the push-pull signal PP for the pit arrays PID3 and PID4 in the same header area, allowing the waveform portions to be detected separately as indicated by generation of the first header detection signal DT·H-1 and the second header detection signal DT·H-2. Thus, a header area can be detected in more detail, allowing predetermined operation control to be executed more finely on the basis of the detailed header detection.

In the embodiment described above, data is played back from a DVD-RAM. It should be noted, however, that the types of the disc from which data is to be played back are not limited to the DVD-RAM. For example, the present invention can be applied even to a track-formatted disc which is a disc having a plurality of areas with optical reflectance values different from each other on circular tracks. In addition, while only playback operations have been explained, the present invention can also be applied as well to a recording operation in which it is necessary to detect a specific area among a plurality of areas with optical reflectance values different from each other on circular tracks.

As described above, in accordance with one aspect of the present invention, there is provided a disc drive apparatus for a disc having a plurality of signal surface areas such as a header area and a recordable area having optical reflectance values different from each other, that is, a plurality of signal surface areas producing detection signals with different amplitudes representing quantities of reflected lights, wherein, in detection of a specific signal surface area such as the header area, an integration output obtained as a result of integration of a pull-in signal (that is, a detection signal representing the quantity of a reflected light) is used as a threshold value to be compared with the pull-in signal to provide a result used for the detection of the header area.

With the configuration described above, the threshold value is not a constant, but varies to follow variations in level which are caused by a variable offset inadvertently superposed on the pull-in signal. Thus, the present invention has an effect that a header area can be detected with a high degree of accuracy in comparison with the conventional configuration using a threshold value which is fixed without regard to an offset inadvertently added to the pull-in signal.

In addition, in accordance with another aspect of the present invention, in detection of a header area, a differentiation output obtained as a result of differentiation of the pull-in signal is integrated by first integration means (integrator) to generate a threshold value to be compared with the differentiation output, and the detection of a header area is based on a result of the comparison. In such a configuration, a first integration output generated by the first integration means as a result of integration of the differentiation output is used as the threshold value which thus varies to follow the pull-in signal's level variations which are caused by a variable offset inadvertently superposed on the pull-in signal as is the case with the aforementioned aspect of the present invention. Furthermore, since the pull-in signal is differentiated in accordance with this other aspect of the invention, a signal placing an emphasis on a level change of the pull-in signal on, for example, a boundary between the header area and a recordable area, is used as a signal to be compared. As a result, the probability of incorrect detection can be reduced.

Moreover, in accordance with a further aspect of the present invention, there is provided second integration means with a time constant smaller than a time constant of the first integration means for generating the threshold value in accordance with the other aspect of the present invention as described above. In this case, a second integration output generated by the second integration means as a result of integration of the differentiation output is compared with the threshold value to give a result of comparison to be used for detection of a header area.

In this configuration, the second integration means increases the width of each differentiation pulse of the differentiation output obtained as a result of differentiation of the pull-in signal according to the other aspect of the present invention to a value equivalent to a period in which the laser-beam spot is passing through the actual header area. Thus, the header area can be detected with a higher degree of precision.

In addition, by adding a predetermined offset to the level of the first integration output generated by the first integration means in accordance with the other aspect of the present invention, it is possible to prevent the second integration output's waveform portion in a recordable area, that is, a signal surface area not subjected to the detection of a header area, from being improperly detected as a waveform portion exceeding the level of the first integration output used as the threshold value in the comparison of the second integration output with the threshold value in the detection of a header area.

Furthermore, in accordance with a still further aspect of the present invention, as a signal to be used for detection of a header area, there is generated a push-pull signal as a difference between detection signals output by 2 detection halves resulting from division of a detection unit for detecting a beam reflected by the signal surface of a disc. In this configuration, predetermined different offsets are added to an integration output obtained as a result of integration of the push-pull signal to provide 2 different threshold values to be compared with the push-pull signal in detection of a header area.

The push-pull signal's waveform portion generated by a pit array recorded in a header area is the inversion of the push-pull signal's waveform portion generated by another pit array recorded in the same header area. Accordingly, the configuration offers a merit that this inversion pattern of the waveform of the push-pull signal allows a header area to be detected in detail. On the other hand, the push-pull signal is prone to variations in level which are generated by a variety of causes.

In the case of this still further aspect of the present invention, however, the generation of threshold values is based on the integration output obtained as a result of integration of the push-pull signal. Thus, the threshold values can also be maintained at levels which follow variations in push-pull signal as well. As a result, this configuration also allows a header area to be detected with a higher degree of accuracy than the conventional method.

In the configuration according to the still further aspect of the present invention, the push-pull signal exhibits a waveform-inversion pattern indicating a header area. Thus, by providing 2 detection circuits, namely, a circuit for detecting the waveform-inversion pattern's portion having a positive polarity and a circuit for detecting the waveform-inversion pattern's portion having a negative polarity, the configuration is capable of detecting not only a header area but also a pattern change of data arrays recorded in the header area. As a result, the reliability of the detection of a header area can be further increased.

What is claimed is:

1. A disc drive apparatus for recording or playing back data onto and from an optical-disc recording medium having a plurality of signal surface areas outputting detected information as reflected detection signals with different amplitudes, said disc drive apparatus comprising:

reflected-light quantity detection means for detecting a total quantity of a light reflected by a signal surface of said optical-disc recording medium and outputting a reflected-light quantity detection signal representing said total quantity;

integration means for integrating said reflected-light quantity detection signal and providing an integration output representing a result of integration of said reflected-light quantity detection signal; and identification-signal generation means for comparing the level of said reflected-light quantity detection signal with the level of said integration output used as a threshold value and for outputting an identification signal identifying a specific signal surface area among said signal surface areas as a result of comparison.

2. A disc drive apparatus for recording or playing back data onto and from an optical-disc recording medium having a plurality of signal surface areas outputting detected information as reflected detection signals with different amplitudes, comprising:

reflected-light quantity detection means for detecting a total quantity of a light reflected by a signal surface of said optical-disc recording medium and outputting a reflected-light quantity detection signal representing said total quantity;

differentiation means for differentiating said reflected-light quantity detection signal and providing a differentiation output representing a result of differentiation of said reflected-light quantity detection signal;

first integration means for integrating said differentiation output at a first predetermined time constant and providing a first integration output representing a result of integration of said differentiation output; and identification-signal generation means for comparing the level of said differentiation output with the level of said first integration output used as a threshold value and for outputting an identification signal identifying a specific signal surface area among said signal surface areas as a result of comparison.

3. A disc drive apparatus according to claim 2, further comprising second integration means for integrating said differentiation output at a second predetermined time constant smaller than said first predetermined time constant and providing a second integration output representing a result of integration of said differentiation output, wherein said identification-signal generation means compares the level of said second integration output in place of the level of said differentiation output with the level of said first integration output used as a threshold value and for outputting an identification signal identifying a specific signal surface area among said signal surface areas as a result of comparison.

4. A disc drive apparatus according to claim 2, further comprising offset means for adding a predetermined offset to the level of said first integration output as a threshold value.

5. A disc drive apparatus for recording or playing back data onto and from an optical-disc recording medium having a plurality of signal surface areas outputting detected information as reflected detection signals with different amplitudes, said disc drive apparatus comprising:

signal generation means for generating a reflected-light detection signal by carrying out predetermined processing based on detection signals obtained by split optical reception of a light reflected by a signal surface of said optical-disc recording medium;

integration means for integrating said reflected-light detection signal and providing an integration output representing a result of integration of said reflected-light detection signal;

offset means for providing an offset of a predetermined magnitude to the level of said integration output; and identification-signal generation means for comparing the level of said reflected-light detection signal with a threshold value obtained as a sum of the level of said integration output and said offset provided by said offset means, and for outputting an identification signal identifying a specific signal surface area among said signal surface areas as a result of comparison.

6. A disc drive apparatus according to claim 5 wherein said offset means and identification-signal generation means comprises a plurality of systems capable of detecting a particular portion of the waveform of said reflected-light detection signal and capable of detecting said waveform's other portion obtained as a result inversion of said particular portion due to a physical recording state of said specific signal surface.

* * * * *